United States Patent
Wong et al.

(10) Patent No.: US 11,485,863 B2
(45) Date of Patent: Nov. 1, 2022

(54) LIQUIDS AND VISCOELASTIC MATERIAL REPELLENT AND ANTI-BIOFOULING COATINGS

(71) Applicant: The Penn State Research Foundation, University Park, PA (US)

(72) Inventors: Tak-Sing Wong, University Park, PA (US); Jing Wang, University Park, PA (US)

(73) Assignee: The Penn State Research Foundation, University Park (PA)

( * ) Notice: Subject to any disclaimer, the term of this patent is extended or adjusted under 35 U.S.C. 154(b) by 0 days.

(21) Appl. No.: 17/202,512

(22) Filed: Mar. 16, 2021

(65) Prior Publication Data
US 2021/0222014 A1    Jul. 22, 2021

Related U.S. Application Data

(63) Continuation of application No. 16/113,342, filed on Aug. 27, 2018, now Pat. No. 10,968,353, which is a (Continued)

(51) Int. Cl.
*C09D 183/04* (2006.01)
*C09D 5/16* (2006.01)
(Continued)

(52) U.S. Cl.
CPC ............. *C09D 5/1681* (2013.01); *B32B 7/02* (2013.01); *B32B 27/28* (2013.01); *C09D 4/00* (2013.01);
(Continued)

(58) Field of Classification Search
CPC ...... C09D 5/1681; C09D 4/00; C09D 5/1662; C09D 183/04; C09D 5/00; B32B 7/02;
(Continued)

(56) References Cited

U.S. PATENT DOCUMENTS 3,978,529 A    9/1976  Krafft
4,839,443 A    6/1989  Akutsu et al.
(Continued)

FOREIGN PATENT DOCUMENTS

CA    954640 A      9/1974
EP    9329041 A2    8/1989
(Continued)

OTHER PUBLICATIONS

MacCallum et al., Liquid-infused Silicone as a Biofouling-free Medical Material, ACS Biomater. Sci. Eng., 2015, 1, 43-51, published Dec. 4, 2014.
(Continued)

*Primary Examiner* — Michael B Nelson
(74) *Attorney, Agent, or Firm* — Dinsmore & Shohl LLP

(57) ABSTRACT

A process for preparing a repellant smooth surface includes applying a coating composition onto a smooth surface of a substrate having hydroxyl functional groups thereon and an average roughness Ra of less than 4 µm. The coating composition includes: (i) a polymerizable silane or siloxane or both selected from the group consisting of dimethyldimethoxysilane, dimethoxy-methyl(3,3,3-trifluoropropyl)silane, dimethoxy(methyl)octylsilane, diethoxydimethylsilane, (ii) a solvent and (iii) an acid catalyst. The process further includes polymerizing the silane or siloxane or both from the hydroxyl functional groups on the smooth surface of the substrate to form a chemical layer of graft polymers having ends anchored to the smooth surface and applying a lubricant coating over the formed chemical layer to adhere and maintain the lubricant on the smooth surface and form a lubricant-entrenched smooth surface as the repellant smooth surface.

10 Claims, 8 Drawing Sheets

Related U.S. Application Data continuation of application No. PCT/US2017/062206, filed on Nov. 17, 2017.

(60) Provisional application No. 62/424,062, filed on Nov. 18, 2016.

(51) Int. Cl.

| | | |
|---|---|---|
| *B32B 27/28* | (2006.01) | |
| *B32B 7/02* | (2019.01) | |
| *E03D 13/00* | (2006.01) | |
| *C09D 4/00* | (2006.01) | |
| *E03D 1/01* | (2006.01) | |
| *E03D 1/00* | (2006.01) | |

(52) U.S. Cl.
CPC ......... *C09D 5/1662* (2013.01); *C09D 183/04* (2013.01); *E03D 1/01* (2013.01); *E03D 13/007* (2013.01); *E03D 1/00* (2013.01); *E03D 13/005* (2013.01)

(58) Field of Classification Search
CPC ......... B32B 27/28; E03D 1/01; E03D 13/007; E03D 1/00; E03D 13/005
See application file for complete search history.

(56) References Cited

U.S. PATENT DOCUMENTS

| | | |
|---|---|---|
| 4,844,986 A | 7/1989 | Karakelle et al. |
| 5,081,165 A | 1/1992 | Inukai et al. |
| 6,432,181 B1 | 8/2002 | Ludwig |
| 6,440,550 B1 | 8/2002 | Hacker |
| 6,676,733 B2 | 1/2004 | Ludwig et al. |
| 6,994,890 B2 | 2/2006 | Ohlhausen et al. |
| 7,754,004 B2 | 7/2010 | Ohlhausen et al. |
| 9,121,307 B2 | 9/2015 | Aizenberg et al. |
| 10,011,800 B2 | 7/2018 | Aizenberg et al. |
| 2004/0185445 A1 | 9/2004 | Fang |
| 2009/0280337 A1 | 11/2009 | Semetey et al. |
| 2010/0056392 A1 | 3/2010 | Greving et al. |
| 2010/0318061 A1 | 12/2010 | Derrick et al. |
| 2011/0311769 A1 | 12/2011 | Chen et al. |
| 2012/0142814 A1 | 6/2012 | Kanagasabapathy et al. |
| 2014/0128960 A1 | 5/2014 | Greenslet et al. |
| 2014/0342954 A1 | 11/2014 | Ingber et al. |
| 2015/0152270 A1* | 6/2015 | Aizenberg .............. A61L 31/06 508/106 |
| 2016/0177129 A1 | 6/2016 | McCarthy et al. |
| 2018/0187022 A1 | 7/2018 | Aizenberg et al. |

FOREIGN PATENT DOCUMENTS

| | | |
|---|---|---|
| JP | 2000273934 A | 10/2000 |
| JP | 2001259509 A | 9/2001 |
| JP | 2007291314 A | 11/2007 |
| JP | 2015507507 A | 3/2015 |
| JP | 2015531005 A | 10/2015 |
| JP | 2017170739 A | 9/2017 |
| KR | 100887573 B1 | 3/2009 |
| KR | 101544313 B1 | 8/2015 |
| WO | 2005/014742 A1 | 2/2005 |
| WO | 2013106588 A1 | 7/2013 |
| WO | 2017-176709 A1 | 10/2017 |

OTHER PUBLICATIONS

Wang, Angew Chem. Int. Ed. 2016, 55, 244-248, published online Nov. 16, 2015.
PubChem Hexadecane found at https://pubchem.ncbi.nlm.nih.gov/compound/Hexadecane, Jun. 5, 2019.
Gelest, Silane Coupling Agents, found at https://www.gelest.com/wp-content/uploads/Goods-PDF-brochures-couplingagents.pdf, 2014.
Jijjain, Sanjeev Kumar et al., "Uniting Superhydrophobic, Superoleophobic and Lubricant Infused Slippery Behavior on Copper Oxide Non-structured Substrates" Scientific Reports, Oct. 18, 2016, pp. 1-10.
Vogel, Nicholas et al.. "Transparency and damage tolerance of patternable omniphobic lubricated surfaces based on inverse collodial monolayers" Nature Communications, 4:2176 (2013).
Wang, Liming et al. "Covalently Attached Liquids: Instant Omniphobic Surfaces with Unprecedented Repellency" Angewandte Chemi International Edition 55, pp. 244-248 (2016).
Wong, Tak-Sing et al. "Bioinspired self-repairing slippery surfaces with pressure-stable omniphobicity" Nature, Sep. 22, 2011, vol. 477, pp. 443-447.
Zhang, Hongbin et al. "Anti-fouling Coatings of Poly(dimethylsiloxane) Devices for Biological and Biomedical Applications, J. Med. Biol. Eng. 2015:35:143-155".
Zhu, Lin et al. "Ice-phobic Coatings Based on Silicon-Oil-Infused Polydimethylsioxane" ACS Applied Materials & Interfaces, 2013, vol. 5, pp. 4053-4062.
Efimenko et al., Surface Modification of Sylgard-184 Poly(dimethyl siloxane) Networks by Ultraviolet and Ultraviolet/Ozone Treatment, Journal of Colloid and Interface Science 254, 306-315 (2002).
European Office Action dated Jan. 27, 2021; European Application No. 17 872 728.5.
Sanghyuk Wooh et al., "Silicon Brushes: Omniphobic Surfaces with Low Sliding Angles", Angewandte Chemie, 2016, vol. 55, pp. 6822-6824.
Kasapgil, Esra et al., "Transparent, fluorine-free, heat-resistant, water repellent coating by infusing slippery silicone oil on polysiloxane nanofilament layers prepared by gas phase reaction of n-propyltrichlorosilane and methyltrichlorosilane," Colloids and Surfaces A, 2019 [Available online Sep. 25, 2018], vol. 560, pp. 223-232.

* cited by examiner

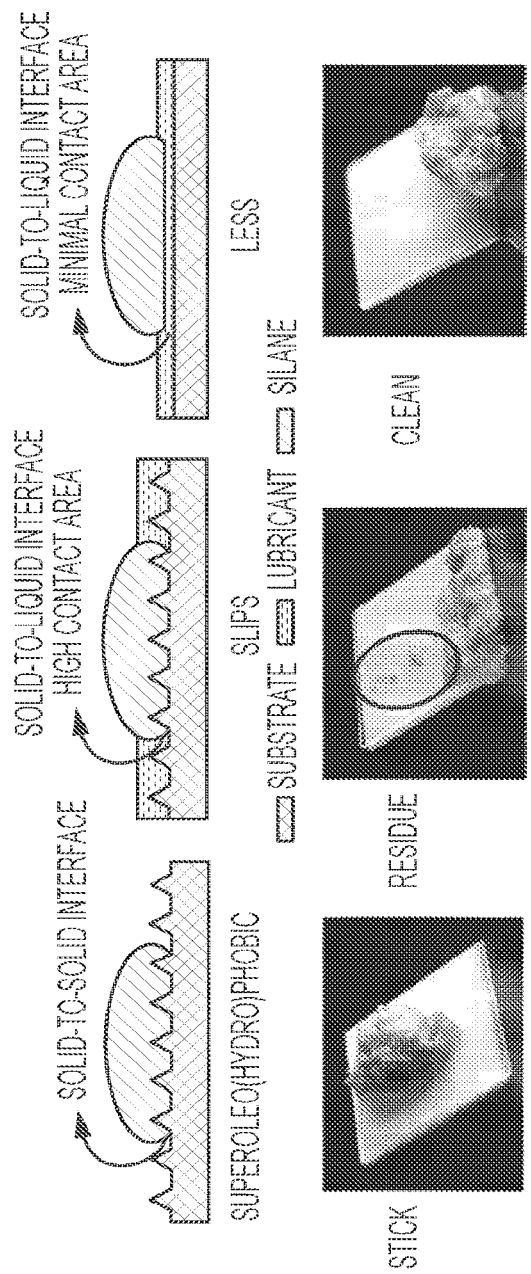
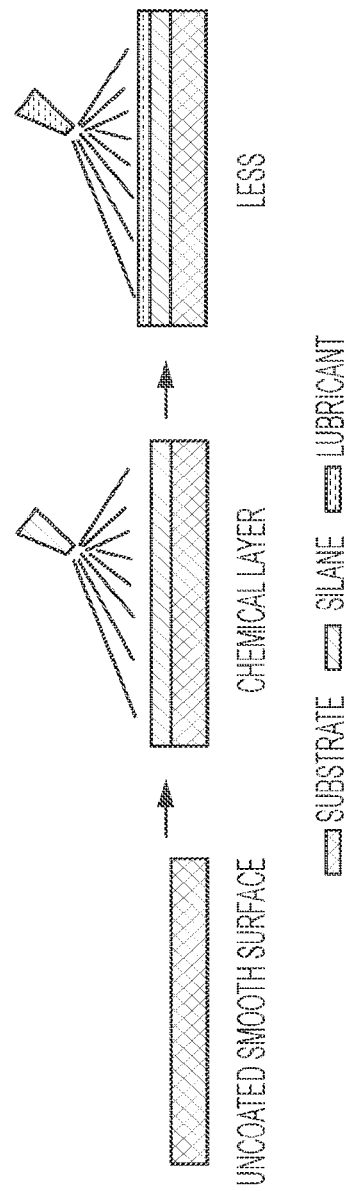
FIG. 1a  FIG. 1b  FIG. 1c
FIG. 2

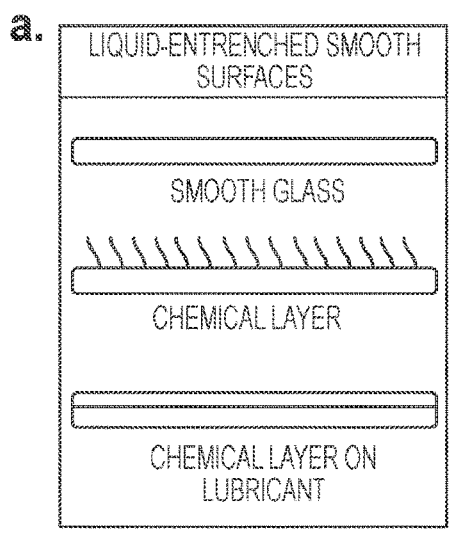
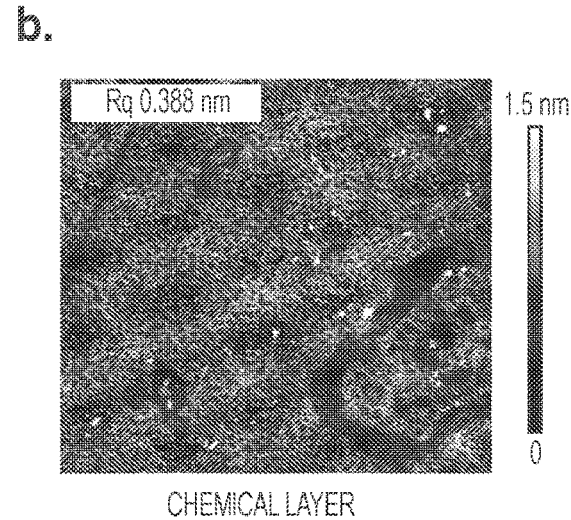
FIG. 3a    FIG. 3b
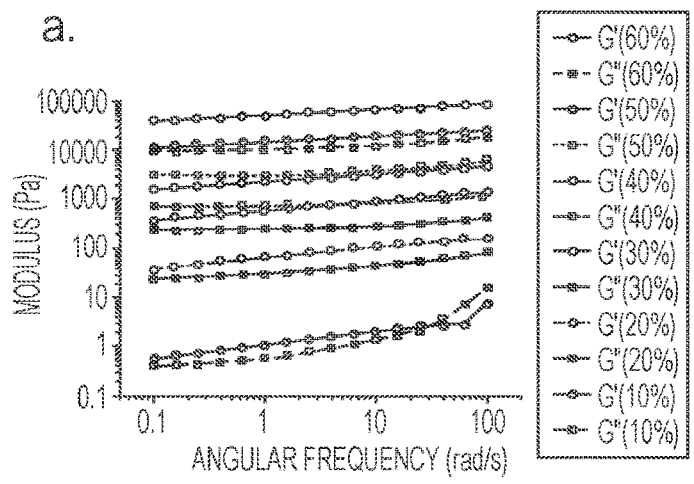
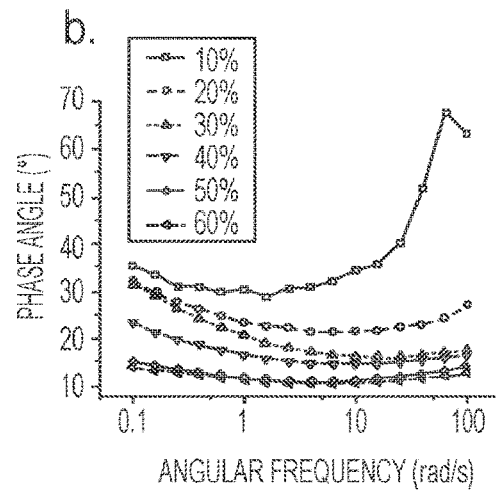
FIG. 4a    FIG. 4b

FIG. 5a
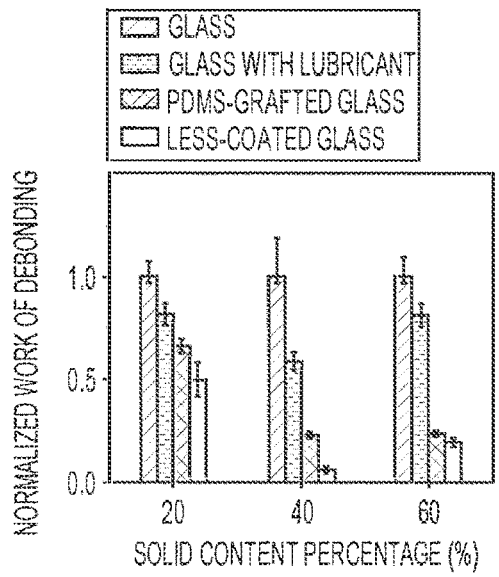
FIG. 5b
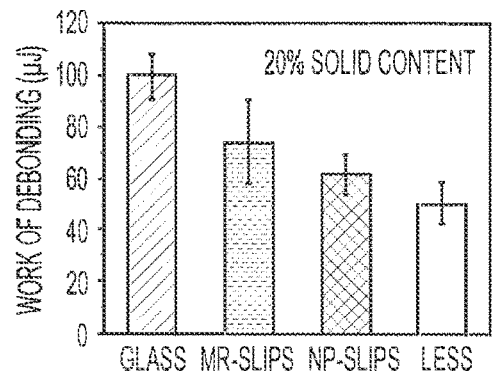
FIG. 5c
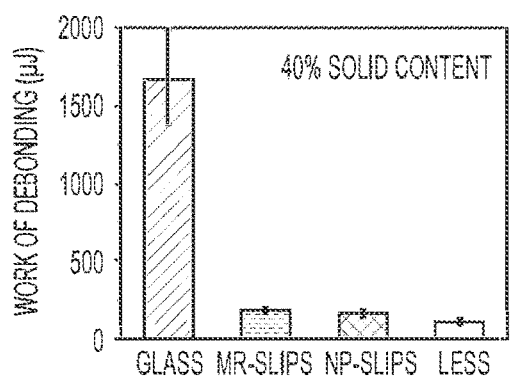
FIG. 5d
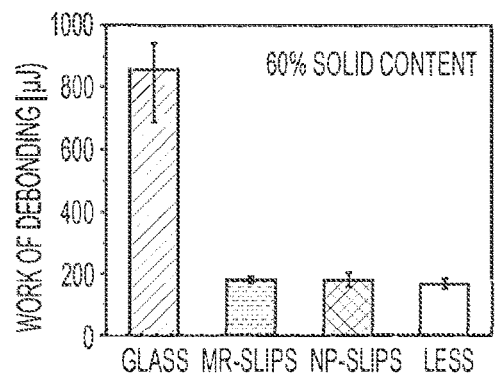
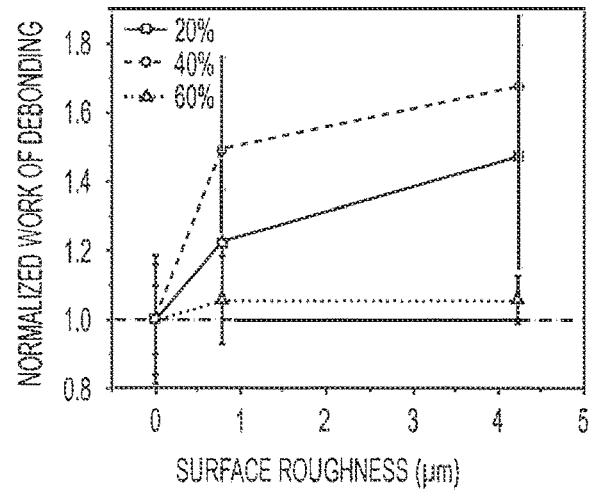
FIG. 6

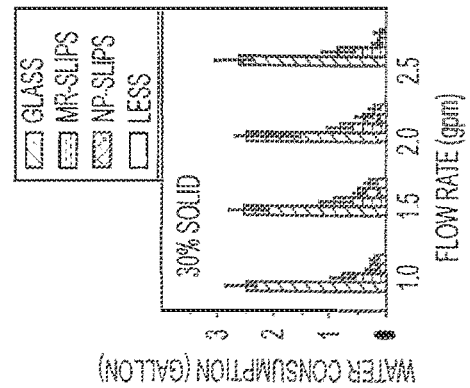
FIG. 16a
FIG. 16b
FIG. 16c
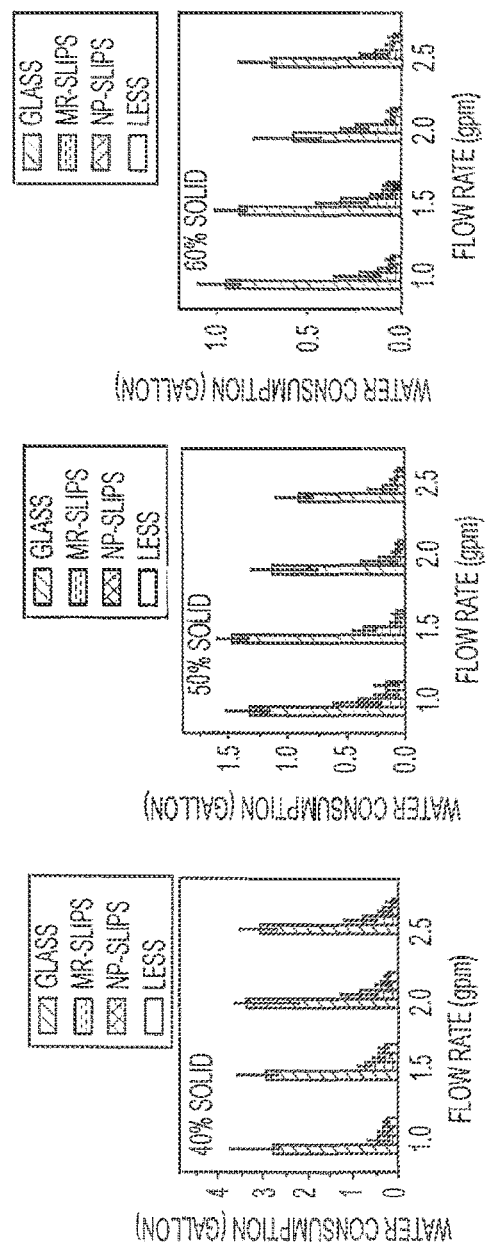
FIG. 16d
FIG. 16e
FIG. 16f

LIQUIDS AND VISCOELASTIC MATERIAL REPELLENT AND ANTI-BIOFOULING COATINGS

CROSS REFERENCE TO RELATED PARAGRAPH

This is a continuation U.S. application Ser. No. 16/113,342 filed Aug. 27, 2018, which is a continuation of International Application No. PCT/US2017/062206 filed 17 Nov. 2017, which claims the benefit of U.S. Provisional Application No. 62/424,062 filed 18 Nov. 2016, the entire disclosures of which are hereby incorporated by reference herein.

TECHNICAL FIELD

The present disclosure relates to a repellant coating on a smooth surface that can repel both liquids and viscoelastic solids, with applications for anti-fouling, anti-staining, anti-scaling, and water-saving systems such as toilets and urinals or other applications for repellant coatings. The repellant coating includes a chemical layer on the smooth surface and a lubricant thereon.

BACKGROUND

Water shortage is a serious global problem. In areas, such as Africa and India, water is in very high demand for living and agriculture. Numerous researchers have been focused on desalination of brine to generate more water, and on advancing piping system in agriculture to save water. However, much less attention has been focused on water usage for flushing toilets. Specifically, two-thirds of people in the world have access to flushing toilet. See World Health Organization and UNICEF Joint Monitoring Programme. Progress on Drinking Water and Sanitation, 2015 Update and MDG Assessment. Each of them flush a toilet at a frequency 5 times per day on average (around 8 gallon of water), and 30 billion gallon of water is flushed away globally per day. Certain regions such as Brazil make use of rainwater to flush toilets. However, rainwater could cause a number of health problems, especially bacterial infection.

Articles have been developed with modified surfaces for fluid and solid repellency. See, e.g., U.S. Patent Publication No. 2014-0342954; U.S. Pat. No. 4,844,986 and Wang et al. Covalently Attached Liquids: Instant Omniphobic Surfaces with Unprecedented Repellency. *Angewandte Chemie International Edition* 55, 244-248 (2016).

However, engineered surfaces that are non-sticky to both semi-solid (e.g. feces, wet molding clay, mustard, etc.) and bacteria are not well-studied and developed because these visco-elastic semi-solids and bacteria are sticky to most surfaces. Existing slippery surfaces, including superhydrophobic surfaces and slippery liquid-infused porous surfaces (SLIPS), are either sticky to bacteria (i.e., superhydrophobic surfaces), or not specifically designed for sticky issues of viscoelastic solids (i.e., superhydrophobic surfaces and slippery liquid-infused porous surfaces). See Wong, T.-S. et al. Bioinspired self-repairing slippery surfaces with pressure-stable omniphobicity, *Nature* 477, 443-447, 2011.

Superhydrophobic surfaces are slippery to water, or even oils using special surface structure designs. However, these surfaces typically lose its repellency under the exposure of biological liquids, such as blood and bacteria fluids. For bacterial fluids, biofilm can form onto the surface structures and destroy the superhydrophobic property. In addition, superhydrophobic surfaces and slippery liquid-infused porous surfaces are not known to repel viscoelastic semi-solids, such as feces or mud.

Accordingly, there is a need for new surface technology that provides a simple solution to repel both liquids and viscoelastic solids for extreme water-saving applications or easy-to-clean medical devices.

SUMMARY OF THE DISCLOSURE

Advantages of the present disclosure include a surface design that can repel both liquids and viscoelastic semi-solids and solids (e.g., viscoelastic materials). Such surfaces are useful for anti-fouling, anti-staining, anti-scaling, and extreme water-saving applications or easy-to-clean medical devices or other applications that benefit from a repellant coating. The surface features a chemical layer and lubricating fluid thereon. Such a coating system is advantageously over a relatively smooth surface resulting in a corresponding smooth lubricating layer that repels both liquids and viscoelastic materials. This lubricating system can provide minimal surface area and hence minimized adhesion to any impacting viscoelastic material.

These and other advantages are satisfied, at least in part, by a coating on a smooth surface of a substrate wherein the coating comprises a chemical layer on the surface of the substrate and a lubricant layer over the chemical layer. Advantageously, the surface of the substrate to be coated is relatively smooth, e.g., the surface has an average roughness $R_a$ of less than about 4 µm, e.g., less than about 2 µm and less than about 1 µm average surface roughness and even less than about 500 nm, e.g., less than about 100 nm. An advantage of the coating of the present disclosure is that the underlying surface substrate is not roughened prior to depositing the coating on the surface.

In an aspect of the present disclosure, the coated surface is part of a surface of a toilet, e.g., an inner surface of a toilet, a urinal, or other device that is useful for processing liquids and viscoelastic materials such as human waste. The minimized adhesion between the viscoelastic materials and the coated surface advantageously allow minimal water consumption to remove the materials from the devices. The smooth surface interface and the liquid-repellent function can also prevent buildup of mineral deposits (e.g., calcium and magnesium carbonates) and other materials that cause stains such as caused by hard water. Such coated surfaces can also be applied to windows for buildings or vehicles such as automobiles or camera lenses to repel liquids (e.g., rain), ice, frost, insect residue, and bird feces. Furthermore, such coated surfaces can delay frost or ice formation and can significantly reduce de-icing time. In an embodiment of the present disclosure, a window made of glass comprises the coating on a smooth surface thereof. The chemical layer and lubricant on such a glass surface can have a refractive index that matches the glass, e.g., the chemical layer and lubricant have a refractive index of between about 1.3 to about 1.6, e.g., between about 1.4 to about 1.5.

In practicing certain aspects of the present disclosure, water or other aqueous fluids can be applied to a device having a coating of the present disclosure to remove a viscoelastic material or a liquid deposited on the coating. Water or other aqueous fluids can be applied to the viscoelastic material or liquid on the coating to remove the material or liquid from the coating. The process advantageously can apply a minimal amount of aqueous fluids or other fluids to the viscoelastic material on the surface of the substrate to remove the viscoelastic material therefrom. In addition, lubricant, either the same or a different lubricant than used to prepare the repellant coating, can be reapplied to the chemical layer to renew the coating system on the surface of the substrate.

Another aspect of the present disclosure includes a process for preparing a repellant surface. The process comprises applying a coating composition onto the surface to form a chemical layer on the surface. A lubricant can then be applied to the formed chemical layer. Advantageously, the lubricant layer can be applied to form a stable lubricant layer over the chemical layer. The method can advantageously be applied to a smooth surface of a substrate. Substrates that can be used with the coating system of the present disclosure include, for example, metals, ceramics, glasses, or any combination thereof.

Embodiments of the present disclosure include one or more of the following features individually or combined. For example, the coating composition can include a (i) a polymerizable silane or siloxane or both, (ii) a solvent and (iii) a catalyst such as an acid catalyst. In other embodiments, the chemical layer can be a polydimethylsiloxane. In still further embodiments, the chemical layer can have nanometer height and be formed from a silane or siloxane to produce a polymer anchored to the surface such as a grafted polydimethylsiloxane. In other embodiments, the lubricant can be one or more of an omniphobic lubricant, a hydrophobic lubricant, a plant-based lubricant and/or a hydrophilic lubricant such lubricants include a perfluorinated oil or a silicone oil or an olive oil or a hydroxy polydimethylsiloxane, for example. In some embodiments, the lubricant or a different lubricant can be reapplied to the chemical layer to renew the coating on the smooth surface.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIGS. 1a, 1b and 1c illustrate schematically and with optical images adhesion of viscoelastic solids to different engineered surfaces including a superhydrophobic glass (FIG. 1a), a Slippery Liquid-Infused Porous Surfaces (SLIPS)-coated glass (FIG. 1b), and a Liquid-Entrenched Smooth Surfaces (LESS)-coated glass (FIG. 1c). The superhydrophobic glass was created using a commercially available superhydrophobic coating (NeverWet, LLC). The SLIPS-coated glass had an underlying surface roughness ~1 μm. The LESS-coated glass had an underlying surface roughness of less than about 1 nm. Synthetic feces with a solid content percentage of 30% (dynamic viscosity of about 2406 Pa·s) were used in these experiments.

FIG. 2 illustrates a method to create a LESS coating onto various surfaces including glass, ceramic, and metals.

FIGS. 3a and 3b illustrate the fabrication process and roughness of according to an embodiment of the present disclosure. FIG. 3a describes a dip-in fabrication process (a spray-coating process can alternatively be used). A smooth substrate was hydroxidized by oxygen plasma for 10 min. Then the substrate was dipped in a coating solution for 10 s, and dried in air for 10 min. A lubricant layer was then applied onto the coated substrate. FIG. 3b shows the roughness of the first elements measured by atomic force microscope (AFM), which is a grafted chemical layer. The roughness is on a nanometer scale, indicating the smoothness of the coated substrate.

FIGS. 4a-4b show the visco-elastic property of synthetic feces. FIG. 4a shows the storage and loss moduli (denoted as G' and G", respectively) of different artificial feces with different solid content fraction (e.g. 10%, 20%, 30%, 40%, 50%, and 60% of solid in synthetic feces). FIG. 4b shows the phase change of different artificial feces under different applied frequency.

FIG. 5a shows the measurements of adhesion between synthetic feces and various surfaces. The work of debonding of each surface is normalized by that of bare glass for the respective solid content. The standard deviations of work of debonding were obtained from at least 4 independent adhesion measurements.

FIG. 5b shows the adhesion measurement of four different surfaces: glass, micro-roughened slippery liquid-infused porous surfaces (MR-SLIPS), nano-porous slippery liquid-infused porous surfaces (NP-SLIPS), liquid-entrenched smooth surfaces (LESS). Work of debonding was measured with synthetic feces of 20% solid content percentage. Standard deviations of the work of debonding were obtained from at least 5 independent measurements. The lubricant used for SLIPS and LESS was silicone oil with a viscosity of 20 cSt.

FIG. 5c shows the adhesion measurement of four different surfaces: glass, micro-roughened slippery liquid-infused porous surfaces (MR-SLIPS), nano-porous slippery liquid-infused porous surfaces (NP-SLIPS), liquid-entrenched smooth surfaces (LESS). Work of debonding was measured with synthetic feces of 40% solid content percentage. Standard deviations of the work of debonding were obtained from at least 5 independent measurements. The lubricant used for SLIPS and LESS was silicone oil with a viscosity of 20 cSt.

FIG. 5d shows the adhesion measurement of four different surfaces: glass, micro-roughened slippery liquid-infused porous surfaces (MR-SLIPS), nano-porous slippery liquid-infused porous surfaces (NP-SLIPS), liquid-entrenched smooth surfaces (LESS). Work of debonding was measured with synthetic feces of 60% solid content percentage. Standard deviations of the work of debonding were obtained from at least 5 independent measurements. The lubricant used for SLIPS and LESS was silicone oil with a viscosity of 20 cSt.

FIG. 6 is a plot comparing the work of debonding of synthetic feces of varying solid contents of surfaces with different roughness, including micro-roughened slippery liquid-infused porous surfaces (MR-SLIPS), nano-porous slippery liquid-infused porous surfaces (NP-SLIPS), liquid-entrenched smooth surfaces (LESS). The data is normalized by the work of debonding of 40% solid content synthetic feces on LESS.

FIG. 8a schematic shows a human feces dropping test procedures, which includes: I) feces dropping from a height of 75 mm, II) feces impacting onto the test surfaces, and III) releasing the surface from horizontal to vertical to determine if feces will adhere onto the surface or not. FIG. 8b shows optical images of test results for different surfaces. The human feces adhere onto ceramic, Teflon, and silicone, but slide off from the LESS-coated glass.

FIG. 12a illustrates experimental procedures for testing sterilization on these surfaces. All surfaces were contaminated with *E. coli* biofilm, and then sterilized with bleach and 70% of alcohol for 10 min before lubrication with sterilized silicone oil. Afterwards, all surfaces were lubricated and incubated with agar film for 36 hours. FIG. 12b is a plot comparing whether bacterial colonies would grow on the surfaces. As shown in the figure, bacterial colonies grow with underlying roughness (MR-SLIPS) while little or no bacteria are found on NP-SLIPS and LESS-coated surfaces. The inset image shows a SEM image of *E. coli*. This suggests that if these surfaces were contaminated (e.g., during an application of interest, if lubricant was depleted), LESS-coated surfaces could be readily sterilized and their anti-biofouling function could be restored.

FIG. 16a illustrates water consumption required to remove synthetic feces (10% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

FIG. 16b illustrates the water consumption required to remove synthetic feces (20% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

FIG. 16c illustrates the water consumption required to remove synthetic feces (30% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

FIG. 16d illustrates the water consumption required to remove synthetic feces (40% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

FIG. 16e illustrates the water consumption required to remove synthetic feces (50% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

FIG. 16f illustrates the water consumption required to remove synthetic feces (60% solid content) from four different surfaces under different flow rates. The flow rate ranges from 1 gallon per meter (gpm) to 2.5 gpm. Four different surfaces include untreated glass, slippery liquid-infused porous surfaces with micro-roughened surface morphology (MR-SLIPS), slippery liquid-infused porous surfaces with nano-porous surface morphology (NP-SLIPS), and liquid-entrenched smooth surfaces (LESS).

DETAILED DESCRIPTION OF THE DISCLOSURE

Figure 7:
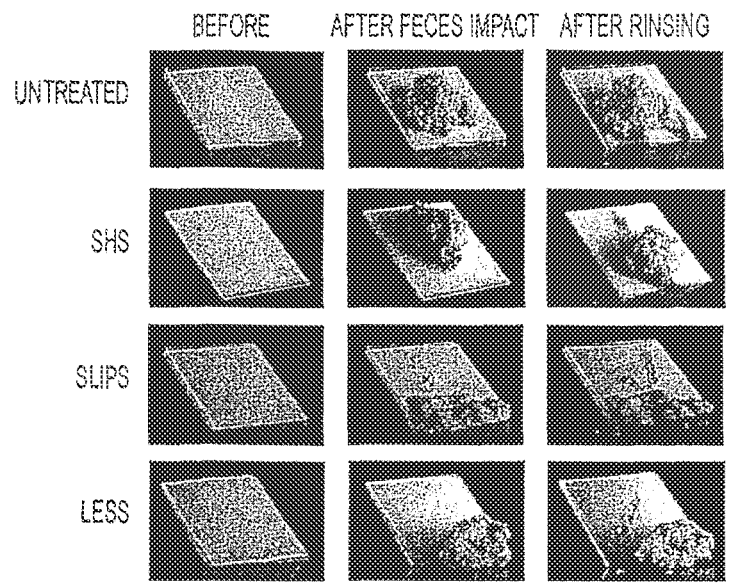
FIG. 7 compares adhesion of a viscoelastic solid to uncoated glass, superhydrophobic glass (SHS), SLIPS-coated glass, and LESS-coated glass. The superhydrophobic glass was created using a commercially available superhydrophobic coating (NeverWet, LLC). The underlying substrate of the SLIPS-coated glass has a surface roughness ~1 μm. The LESS-coated glass had an underlying surface roughness of less than about 1 nm. The solid content percentage of the synthetic feces used is 30%. Dyed water (in blue) is sprayed onto the surface for cleaning purpose.

The present disclosure relates to a coated surface of a substrate that includes a chemical layer on the surface that can maintain a thin lubricant layer thereover to form a repellant surface. Advantageously, the surface is relatively smooth and does not require surface roughening which contrast from certain other repellant surfaces such as superhydrophobic surfaces and slippery liquid-infused porous surfaces. Compare FIGS. 1a-1b to FIG. 1c. Coated surfaces in accordance with the present disclosure are referred to herein as a liquid-entrenched smooth surface (LESS).

Coated surfaces in accordance with the present disclosure are useful on certain devices such as toilets, urinals, or other devices for the processing of liquids and viscoelastic materials such as solid or semi-solid metabolic waste of human digestive system. Such coated surfaces can also be applied to windows for buildings or vehicles such as automobiles or camera lenses to repel liquids (e.g., rain), ice, frost, insect residues, and birds' feces. Furthermore, such coated surfaces can delay frost or ice formation and can significantly reduce the de-icing time.

In an aspect of the present disclosure, the surface of the substrate to be coated is relatively smooth, e.g., the surface has an average roughness at a microscale level, e.g., $R_a$ less than a few microns, or less than a few hundreds of nanometers, and preferably less than a few nanometers. In embodiments of the present disclosure, the surface of the substrate to be coated has an average surface roughness $R_a$ less than about 4 µm, e.g., less than about 2 µm and less than about 1 µm average surface roughness. In certain other embodiments, the average surface roughness $R_a$ is less than about 500 nm, e.g., less than about 100 nm and even less than about 10 nm. The average surface roughness $R_a$ of the substrate to be coated can be in the range of greater than about 0.5 nm to less than about 2 µm.

Average surface roughness can be measured by atomic force microscope (AFM) using tapping mode with a scanning area of 2×2 µm$^2$ for measuring average surface roughness in a 0.1-nanometer scale or equivalent technique. Average surface roughness can be measured by Zygo optical profilometer with an area of 475×475 µm$^2$ for measuring average surface roughness in a 1-nanometer scale or equivalent technique.

An advantage of the coatings of the present disclosure is that the underlying surface substrate is not roughened as in a SLIPS coating system. As such the coatings of the present disclosure can be readily applied on smooth surfaces without the need to affect the surface roughness. For example, the coatings of the present disclosure can be directly applied to toilet or urinal surfaces as well as window glass. Toilet and urinal surfaces generally have an average surface roughness of less than about 500 and even as low as about 200 nm and 50 nm, and window glass can have an average surface roughness of less than about 150 nm, e.g. between about 0.1 nm to about 100 nm. Alternatively, the surface to be coated can be smoothened prior to applying the coating system of the present disclosure. Hence, in certain embodiments, the surface roughness does not need to be altered prior to applying a coating according to the present disclosure. In other embodiments, the surface can be made to have a lower surface roughness, not roughened, prior to prior to applying a coating according to the present disclosure.

Substrates having a smooth surface that can be used in the present disclosure include those of silicon, ceramics, china, porcelain, glass, and metals such as carbon steel, copper, aluminum, and titanium. If metal surfaces are chosen as the base substrate, oxygen plasma can be used to treat the surface to generate hydroxyl functional groups thereon. The surface can be cleaned before applying the chemical layer. In an implementation of the present disclosure, a process for preparing a repellant surface includes applying a coating composition onto the surface to form a chemical layer on the surface; and applying a lubricant to the chemical layer.

A chemical layer can be formed on a smooth surface by applying a coating composition onto the surface to form a chemical layer on the surface. The coating composition can be applied by a dip coating process or spraying. The chemical layer can also be formed by chemical vapor deposition (CVD) method. In an aspect of the present disclosure, the coating composition includes three components: a coating chemical, a solvent, and a catalyst. Applying a coating composition onto a smooth surface can form a chemical layer by anchoring the coating chemical to the surface and, in certain embodiments, further polymerize the coating chemical from the anchored coating chemical.

Useful coating chemicals include silanes and siloxanes such as, for example, dimethyldimethoxysilane, trimethoxymethylsilane, 1H,1H,2H,2H-perfluorododecyltrichlorosilane, 1H,1H,2H,2H-perfluorodecyltrimethoxysilane, trimethoxy(3,3,3-trifluoropropyl)silane, dimethoxymethyl(3,3,3-trifluoropropyl)silane, dimethoxy(methyl)octylsilane, trimethylmethoxysilane, diethoxydimethylsilane, dimethoxymethylvinylsilane, hexamethyldisiloxane, octyldimethylchlorosilane, octamethylcyclotetrasiloxane etc., 1H,1H,2H,2H-perfluorodecyltriethoxysilane, 1H,1H,2H,2H-perfluorooctanephosphonic acid. Useful solvents include alcohols such as ethanol, isopropanol, ketones such as acetone, methylethylketone, chlorinated solvents such as chloroform, etc. Useful catalysts include acid catalysts such as sulfuric acid, hydrochloric acid, and superabsorbent polymers soluble for isopropanol or ethanol etc.

In one embodiment of the present disclosure, the chemical layer is a silane or siloxane polymer anchored onto the smooth surface, such as a polydimethylsiloxane grafted on the surface of the substrate, which can be prepared from a coating composition including a polymerizable coating chemical, a solvent, and a catalyst. As a demonstration, dimethyldimethoxysilane was used as a polymerizable coating chemical. The coating composition included 10 wt % of the dimethyldimethoxysilane in isopropanol and the catalyst made up 1 wt % of the coating composition. In some embodiments, the chemical layer can have a sub-nanometer height.

A lubricant that is compatible with the chemical layer is then applied over the chemical layer. The lubricant can be applied by a wiping, spraying, etc. To form a stable lubrication layer, the lubricant should have a strong affinity to the chemical layer or the substrate. In some embodiments, the lubricant can be one or more of an omniphobic lubricant, a hydrophobic lubricant and/or a hydrophilic lubricant such lubricants include a perfluorinated oil or a silicone oil or a hydroxy polydimethylsiloxane (PDMS) or a plant oil. For example, perfluorinated oils (e.g. Krytox oil) can form a stable lubrication layer on surfaces modified by silanes and especially perfluorinated silanes. Silicone oil can form a stable layer on surfaces having a chemical layer formed from siloxanes such as polydimethylsiloxane (PDMS) or grafted PDMS, for example. Hydroxy PDMS can also form a stable layer on surfaces having a chemical layer formed from siloxanes such as polydimethylsiloxane (PDMS) or grafted PDMS, for example. Mineral oils can form a stable layer on surface having a chemical layer formed by alkyltrichlorosilanes or alkyltrimethoxysilanes with various chain lengths. Other lubricants that will be compatible with alkyltricholosilanes or alkyltrimethoxysilanes with various chain lengths include alkane oils (e.g. decane, dodecane, hexadecane, or a mixture of them etc.), plant based oils such as olive oil, palm oil, soybean oil, canola oil, rapeseed oil, corn oil, peanut oil, coconut oil, cottonseed oil, palm oil, safflower oil, sesame oil, sunflower oil, almond oil, cashew oil, hazelnut oil, macadamia oil, Mongongo nut oil, pecan oil, pine nut oil, walnut oil, grapefruit seed oil, lemon oil, orange oil, amaranth oil, apple seed oil, argan oil, avocado oil, babassu oil, ben oil, borneo tallow nut oil, cape chestnut oil, carob pod oil, coca butter, cocklebur oil, cohune oil, grape seed oil, Kapok seed oil, Kenaf seed oil, Lallemantia oil, Marula oil, Meadowfoam seed oil, mustard oil, Okra seed oil, papaya seed oil, Pequi oil, poppyseed oil, pracaxi oil, prune kernel oil, quinoa oil, ramtil oil, Sapote oil, Shea butter, tea seed oil, tigernut oil, tomato seed oil, and other similar plant-based oils etc. The plant-based oils can be used alone or with other lubricants or as a mixture of plant-based oils alone or with other lubricants. Lubricant viscosities ranging from ~1 cSt to ~1000 cSt would be preferable at temperature range from 15° C. to 25° C. Lubricant densities of less than about 1 g/cm$^3$ would be preferable at temperature range from 15° C. to 25° C.

In one aspect of the present disclosure, the coating according to the present disclosure is on a smooth surface, or part thereof, of a device such as toilets, urinals, for the processing of liquids and viscoelastic materials such as solid or semi-solid metabolic waste of human digestive system or household or industrial sinks. Such coated surfaces can also be applied to windows for buildings or vehicles such as automobiles or camera lenses to repel liquids (e.g., rain and fog), ice, frost, insect residues, and birds' feces. Furthermore, such coated surfaces can delay frost/ice formation and can significantly reduce the de-icing time.

In an embodiment of the present disclosure, a window made of glass comprises the coating on a smooth surface thereof. The chemical layer and lubricant can have a refractive index that matches the glass, e.g., the chemical layer and lubricant can have a refractive index of about 1.3 to about 1.6, e.g., between about 1.4 to about 1.5, such as where the chemical layer is a silane and the lubricant has a refractive index of about 1.3 to about 1.6, e.g., between about 1.4 to about 1.5.

In practicing certain aspects of the present disclosure, water or other aqueous fluids can be applied to a device having a coating of the present disclosure to remove solid, e.g., viscoelastic material, or liquid on the coating. For example, viscoelastic materials, such as viscoelastic semi-solid waste, can be processed by contacting viscoelastic materials onto a coated surface of a substrate. The coated surface includes a chemical layer on the surface and lubricant layer thereover. Water or other aqueous fluids can be applied to the viscoelastic materials or liquids on the coating to remove the materials from the coating. In addition, lubricant, either the same or a different lubricant than used to prepare the repellant coating, can be reapplied to the chemical layer to renew the coating on the surface of the substrate.

In designing the coated substrates of the present disclosure, several considerations should be given. The following provides particular considerations and examples for the design of a coating on a smooth surface of a substrate in accordance with the present disclosure. For example, adhesion between a viscoelastic solid and the underlying solid surface can be quantified by the adhesion energy at the solid-to-solid interface. Specifically, the adhesion energy, $G_c$, can be expressed as:

$$G_c = w_a \Phi_v (da/dt, T, \epsilon) \quad (1)$$

where $\Phi_v$ is a mechanical loss function, which depends on crack growth rate $da/dt$, temperature T, and strain $\epsilon$ of the viscoelastic solid, and $w_a$ is thermodynamic work of adhesion. Since the crack growth rate and strain are inherit properties of the viscoelastic solid, reducing the adhesion of the viscoelastic solid and the substrate surface would require lowering the work of adhesion. Specifically, the work of adhesion can be expressed as $w_a = \gamma_{13} + \gamma_{23} - \gamma_{12}$, which can be further simplified by Girifalco and Good equation as:

$$w_a = 2(\gamma_{13} \cdot \gamma_{23})^{1/2} \quad (2)$$

where $\gamma_{ij}$ is the interfacial energy at the i-j interface, and 1, 2, and 3 refer to the underlying solid substrate, the viscoelastic solid, and air, respectively. In order to reduce the work of adhesion, the adhesion between the underlying solid-air interface ($\gamma_{13}$) and the viscoelastic solid-air interface ($\gamma_{23}$) would need to be reduced.

Traditionally, there are two methods to decrease these interfacial energies ($\gamma_{13}$ and $\gamma_{23}$). The first method involves surface chemistry modification of the underlying solid substrate (e.g. silanization), which can effectively reduce $\gamma_{13}$. The second method involves lubrication between the viscoelastic solid and the substrate surface. As reported previously, the lubricant could be absorbed by the viscoelastic solids instead of being adhered onto the substrate surface, resulting in the reduction of $\gamma_{23}$. In order to reduce both $\gamma_{13}$ and $\gamma_{23}$ concurrently, the lubricant would need to stably adhere on the underlying surface so as to retain a thin layer of lubricant. In this specific case, the adhesion interface changes from a solid-to-solid interface (i.e., viscoelastic solid-to-underlying solid substrate) to a solid-to-lubricant interface (i.e., lubricant-infused viscoelastic solid-to-lubricant-coated solid substrate).

In addition, the total work of adhesion between two surfaces is directly proportional to their respective contact area, which could be significantly increased by the presence of roughness. In 1960s, Carl A. Dahlquist showed experimentally that when the storage modulus of an adherent material is below a certain critical value (i.e., typically 0.3 MPa), the material will begin to flow and form conformal contact with the surface roughness of the adherent regardless of the applied pressure. This is widely known as the Dahlquist criterion, which has been the basis for the design of pressure sensitive adhesives. For a viscoelastic material that satisfies the Dahlquist criterion, any roughness present on the adherent would further increase the surface adhesion. Therefore, reducing the surface roughness of the underlying solid substrate will be another important method to further reduce the surface adhesion.

To verify the adhesion mechanics of different surfaces, we prepared synthetic feces that have organic solid content very similar to that of human feces for adhesion characterization on surfaces of varying roughness (see Tables 1 and 2). The recipe of synthetic human feces was developed from the original recipe developed at the University of KwaZulu Natal at South Africa. The synthetic human feces are composed of yeast, psyllium, peanut oil, miso, polyethylene glycol, calcium phosphate, cellulose, and water. All solid components are expressed as dry mass, and the corresponding percentages are shown in Table 1. The composition of the synthetic feces is biologically very similar to human feces (see Table 2). The viscosity of the synthetic feces can be tuned by the percentage of solid contents. We made synthetic feces with solid percentage of 10%, 20%, 30%, 40%, 50%, and 60%. These synthetic feces were used within 5 hours of preparation for viscoelasticity measurements, adhesion tests, and water consumption tests.

TABLE 1

Compositions of the synthetic feces.

| Ingredients | % dry mass | Nutrition |
|---|---|---|
| Yeast | 32.49 | Biomass |
| Psyllium | 10.84 | Fibre |
| Peanut oil | 17.31 | Fat |
| Miso | 10.84 | Fibre/Protein/Fat |
| Polyethylene glycol | 12.14 | Carbohydrate |
| Calcium phosphate | 10.84 | Biomass |
| Cellulose | 5.53 | Carbohydrate |

TABLE 2

Comparison of dry mass percentage of human and synthetic feces.

| Organic Content | % dry mass - Human feces | % dry mass - Synthetic feces |
|---|---|---|
| Bacterial Biomass | 25-54 | 43.33 |
| Protein or nitrogenous matter | 2-25 | 6.21 |
| Carbohydrate or undigested plant matter | 25 | 28.81 |
| Fat | 2-15 | 21.65 |

The work of adhesion, $w_a$, at the feces and substrate interface can be simplified as $w_a = 2(\gamma_{13} \cdot \gamma_{23})^{1/2}$ by the Girifalco and Good equation. Health human feces contain about 70% of water with the rest consisting of organic matters. Therefore, we can estimate the upper bound of their surface energy ($\gamma_{13}$) to be similar to that of water (i.e., $\gamma_{13} \leq \sim 72$ mJ/m$^2$). From previous literature, glass surface ($\gamma_{23}$) has surface energy as 310 mJ/m$^2$. Based on the aforementioned equation, the work of adhesion between human feces and glass surface ($w_{a0}$) is $\leq 299$ mJ/m$^2$.

There are three different methods to reduce the work of adhesion. The first method involves silanization of the glass surface with grafted-polydimethylsiloxane (PDMS). Since the grafted PDMS has nearly identical chemical structure as the silicone oil, one can assume their surface energies to be similar. The surface energy of silicone oil is measured to be about 21 mJ/m$^2$. Therefore, the work of adhesion between the synthetic feces and a PDMS-grafted glass ($w_{a1}$) would be ~78 mJ/m$^2$. In the second method, a lubricating layer (silicone oil) can be added in between the feces and an untreated glass surface to reduce the adhesion. Since silicone oil is preferably to be absorbed to feces, only the surface energy of feces ($\gamma_{13}$) changes. Note that the silicone oil could be partially or fully infused into the feces, therefore we assume that the surface energy of feces ($\gamma_{13}$) to be ~72 mJ/m$^2 \geq \gamma_{13} \geq \sim 21$ mJ/m$^2$. As a result, the work of adhesion between the synthetic feces and a silicone-oil lubricated glass ($w_{a2}$) would be ~299 mJ/m$^2 \geq w_{a2} \geq \sim 161$ mJ/m$^2$. The third method involves coating a lubricating layer between the feces and a chemically treated glass so as to retain a thermodynamically stable lubricant layer on the substrate. In this case, we have ~72 mJ/m$^2 \geq \gamma_{13} \geq \sim 21$ mJ/m$^2$, and $\gamma_{23} \approx 21$ mJ/m$^2$. Therefore, the work of adhesion on the LESS-treated glass ($w_{a3}$) is ~78 mJ/m$^2 \geq w_{a3} \geq 42$ mJ/m$^2$. Overall, we have $w_{a2} > w_{a1} \geq w_{a3}$ and this trend is consistent with the experimental measurements.

The solid contents of the synthetic feces range from 10 wt % to 60 wt %, which correspond to storage modulus of ~1 Pa (~10% solid content) to ~10$^5$ Pa (~60% solid content). These values closely emulate those of the fresh human feces. Based on the Dahlquist criterion, most of the synthetic feces used here would be conformally contacting the rough surfaces, particularly for the synthetic feces whose storage moduli are much less than 0.3 MPa. Our adhesion measurements showed that surface adhesion of the synthetic feces increases with the surface roughness (with average roughness, $R_a$ ranges from 0.87±0.06 nm to 4.12±0.26 μm), indicating a relatively smooth surface would be desirable in reducing surface adhesion with feces. Experimentally, it is found that surfaces with average roughness of less than 1 μm are preferable, or even with a $R_a$ of less than about 10 nm. (FIG. 1c and Table 3).

TABLE 3

Average surface roughness of various base substrates.

| Materials | Ceramic | Carbon Steel | Titanium |
|---|---|---|---|
| $R_a$ (nm) | 598 ± 35 | 451 ± 50 | 661 ± 30 |

Note: Ra is measured based on an area of 478 μm by 478 μm.

In addition to the use of relatively smooth substrate, the lubricant has to preferentially adhere to the substrate, which would require matching surface chemical affinity (i.e., forming a stable lubricant layer). Thermodynamically, to achieve this condition one should have, $$\Delta E_1 = \gamma_B \cos\theta_B - \gamma_A \cos\theta_A - \gamma_{AB} > 0 \quad (3)$$

where $\gamma_A$ and $\gamma_B$ are, respectively, the surface tensions of the foreign liquids to be repelled and the immiscible lubricant, $\gamma_{AB}$ is the interfacial tension at the liquid-liquid interface, and $\theta_A$ and $\theta_B$ are, respectively, the equilibrium contact angles of the foreign liquids and the lubricant on a given flat solid surface. In contrast to Slippery Liquid Infused Porous Surface (SLIPS) which requires a rough surface for lubricant retention (see FIG. 1b), LESS use a relatively smooth surface for adhesion reduction. (Typically a SLIPS structure includes a synthetically roughened surface and has an average surface roughness greater than ~150 nm and as high as 100 μm). In accordance to the Dahlquist criterion, this smooth architecture is important for repelling viscoelastic solids.

Since LESS employs a lubricant for its function against aqueous liquids and viscoelastic solids, it will be desirable in certain embodiments to develop a lubricant replenishment strategy to renew the surface in case the lubricant layer is depleted over time due to evaporation and external fluid shear. During the lubricant replenishment process, the following thermodynamic condition has to be satisfied so that it is energetically favorable for the lubricant to displace the aqueous liquid-wetted surface, $$\Delta E_2 = \gamma_B \cos\theta_B - \gamma_A \cos\theta_A + \gamma_A - \gamma_B > 0 \quad (4)$$

In summary, LESS can be formed onto a surface if 1) the base substrate is relatively smooth, preferably with less than about 500 nm average roughness, or even less than about 100 nm average roughness, and 2) $\Delta E_1 > 0$ (stable lubricant formation), and 3) $\Delta E_2 > 0$ (lubricant replenishment).

LESS can be formed by first functionalizing the base substrate with a different surface chemistry, such that the lubricant can preferentially wet onto the functionalized surface and can satisfy the criteria $\Delta E_1 > 0$ (stable lubricant formation) and $\Delta E_2 > 0$ (lubricant replenishment).

In one of these approaches, the smooth substrate can be selected to be hydrophilic with hydroxyl groups available on the surface (either naturally available or after specific surface treatment such as oxygen plasma). Examples of such surfaces include glass, silicon, ceramic, china, porcelain, and certain metals such as carbon steel, copper, aluminum, and titanium. If metal surfaces are chosen as the base substrate, oxygen plasma can be used to treat the surface to generate hydroxyl functional groups thereon.

Before applying the surface functionalization, the surface is preferably cleaned to remove any surface residues. One example for the cleaning involves the use of an alcohol, e.g., ethanol or isopropanol, and deionized water to rinse the surface. After the surface is allowed to dry, it can be treated with silane solution which enables alternation of the surface chemistry. Once the surface is clean, a solution containing silane or siloxane molecules can be sprayed or wiped onto the surface, allowing these molecules to react with the hydroxyl groups and forming a covalently-bonded chemical layer on the substrate. See, e.g. FIG. 2. The silane or siloxane solution can either be sprayed coated or wiped onto the surface and allowed to dry in ambient condition (temperature from 0° C. to 60° C., and relative humidity from 30% to 80%) for 10 min.

One specific example of the silane solution includes 10 wt % of dimethyldimethoxysilane with addition of 1 wt % concentrated sulfuric acid and was mixed successively with isopropanol as the solvent. The silanized substrate then becomes hydrophobic and can repel both water and alkanes. The formation of the new surface functional group was confirmed by X-ray photoelectron spectroscopy (XPS) measurements showing the formation of Si—O bonds associated with dimethyldimethoxysilane. The thickness of the chemical coating layer can range from about 1 nm to about 10 μm.

Once the chemical layer is formed, lubricant can be applied onto the functionalized surface either by wiping or spray coating. Examples of the lubricants include silicone oil or hydroxy polydimethylsiloxane. Lubricant viscosities ranging from ~1 cSt to ~500 cSt would be preferable at temperature range from 15° C. to 25° C. In one of the examples, the PDMS-grafted surface is preferentially wetted by silicone oil, forming a stable lubricating layer. The rinsing process can be skipped as the excess coating chemical is soluble in lubricant (e.g. silicone oil). The thickness of the lubricant layer ranges from ~1 nm to ~1 mm. Our experimental measurements have shown that this specific material combination (i.e., silicone oil and PDMS-grafted surface, $\gamma_A=71.1\pm0.2$ mN/m, $\gamma_B=20.7\pm0.3$ mN/m, $\theta_A=106.5°\pm0.4°$, $\theta_B=\sim0°$, $\gamma_{AB}=31.7\pm0.1$ mN/m) satisfies the relationship outlined in Eq. 3 (i.e, $\Delta E_1=9.2$ mN/m). The two-step fabrication process generally takes less than 10 minutes.

As such, the coated surfaces of the present disclosure can be prepared by a facile fabrication process. FIG. 3 shows an embodiment of preparing such a coated surface. As shown, a covalently bonded chemical layer on a smooth substrate (FIG. 3a) can initially be formed. For experimentation, smooth glass slides were cleaned by ethanol and then hydroxidized by oxygen plasma for 10 min before dipping them into a coating solution which formed a PDMS on the surface of the silds. After dipping into the coating solution for 10 s, the glass slides were dried in ambient condition for 10 min. After rinsing with toluene and isopropanol, the glass slides were coated to form a thin chemical layer without introducing any additional roughness (FIG. 3b). The rinsing process can be skipped as the excess coating chemical is soluble in lubricant (e.g. silicone oil here). Before lubrication, the coated glass slides repel alkane oils and water, and have the ability to self-clean. To complete the LESS, lubricant was applied onto the surface by spin or spray coating.

To form a stable lubricant layer, the substrate surface needs to have a strong chemical affinity to the lubricant. We used X-ray photoelectron spectroscopy (XPS) to show that dimethyldimethoxysilane as the adhesion layer was successfully coated on quartz glass slides. A graft PDMS layer was confirmed to be coated on the glass by the XPS data. The PDMS layer has a strong affinity to silicone oil. After lubrication, the coating can repel water and complex aqueous liquid (e.g. sheep blood).

Different from the traditional SLIPS, the coated surfaces of the present disclosure, i.e., Liquid-Entrenched Smooth Surface (LESS), do not require surface roughness to maintain lubricant. The presence of the surface roughness of SLIPS may lead to adhesion of the viscoelastic solids upon impact. In certain embodiments, the surface roughness does not need to be altered prior to applying a coating according to the present disclosure. In other embodiments, the surface can be smoothened, not roughened, prior to prior to applying a coating according to the present disclosure.

To characterize the repellant performance of LESS-coated surface with other commonly-used and state-of-the-art materials, we used synthetic feces with 20%, 40% and 60% solid content percentage to measure the adhesion on different surfaces. The viscoelastic property was measured as shown in FIG. 4. The control surfaces in these tests include uncoated glass, glass lubricated with silicone oil, PDMS-grafted glass, and silicone-oil infused SLIPS samples with either microscale ($R_a\sim4$ μm) or nanoscale roughness ($R_a<1$ μm) on the underlying substrates. To simulate the condition of synthetic feces impact, we measured the average impact force by high speed camera (release height: 400 mm; feces weight: 5 g; impact area: $24.5\times25.3$ mm$^2$). Our measurements showed that the average impact forces were ~0.23 N, ~2.33 N, and ~5.60 N for 20%, 40%, and 60% synthetic feces, respectively. Therefore, we set 0.5 N, 5 N, and 10 N as the upper limits of the loading forces in our adhesion measurement for 20%, 40%, and 60% synthetic feces, respectively.

Our results showed that lubrication on bare glass (without chemical functionalization) can reduce the surface adhesion by ~41% for synthetic feces with 40% solid content (i.e., the stickiest sample in the test). In comparison, grafted-PDMS glass can reduce the surface adhesion by ~75%, while the LESS coating can reduce the adhesion by ~90% (FIG. 5). Our measurements also showed that the adhesion increases with increasing underlying surface roughness (FIG. 6). In general, the LESS-coated surface outperforms other control surfaces, including untreated surfaces with or without lubrication, and SLIPS with different underlying roughness (FIG. 7).

Figure 8A:
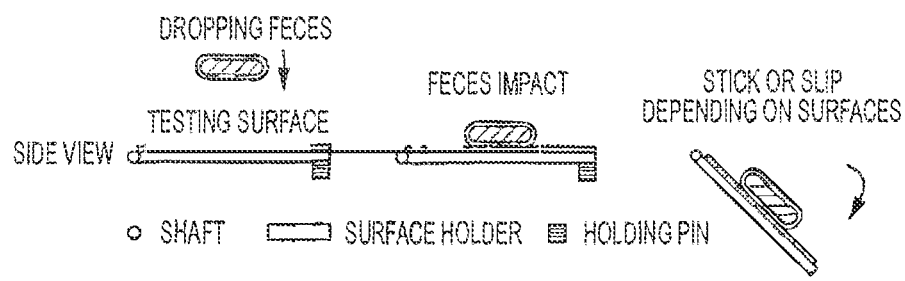
FIGS. 8a and 8b illustrate a human feces dropping test on different commercially available surfaces compared to a LESS-coated glass surface.
Figure 8B:
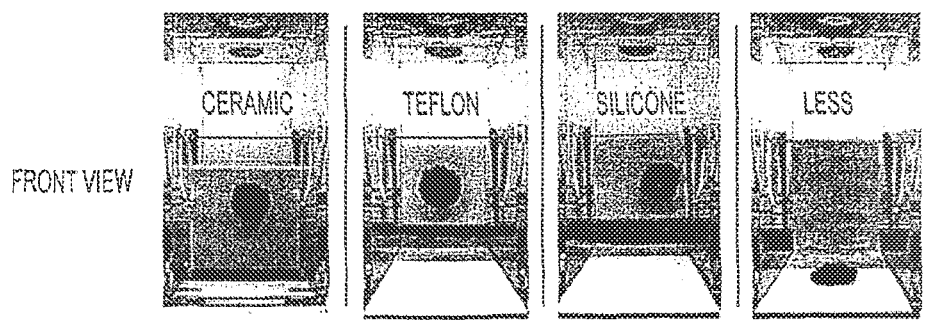
Figure 9:
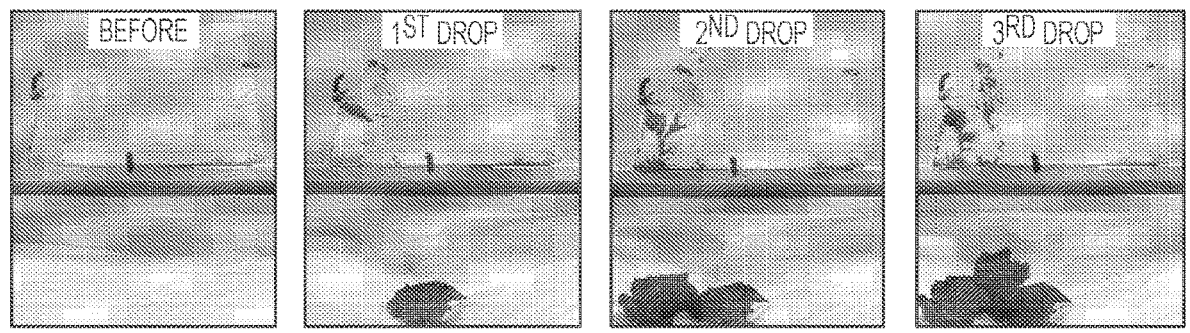
FIG. 9 shows the results of a human feces dropping test on SLIPS-coated aluminum. The SLIPS-coated aluminum had an underlying surface roughness ~1 µm. The lubricant used here is Krytox 101 (DuPont, viscosity ~18 cSt), whose viscosity is similar to the silicone oil (viscosity 20 cSt) used on LESS. The human feces (~10 grams) were dropped from ~80 mm height. After 1-3 feces drops, the SLIPS-coated aluminum included feces residue.

Additionally, we compared the adhesion performance of human feces on LESS and other state-of-the-art and commercially available surfaces. Specifically, we used glazed ceramic (a typical toilet material), Teflon, and silicone as the control surfaces (FIG. 8). For these tests, we used a setup that allows human feces samples to be released from a drop rig at the same height onto an acrylic support where the test coating is placed. When the support pin for the acrylic surface is removed, the surface drops from a horizontal position to a vertical position, where the feces are expected to slide down the face of the surface. In our tests, all the commercial surfaces show extreme stickiness towards the human feces samples. LESS-coated glass, however, was the only surface showing non-stickiness towards the feces sample and left no noticeable residue behind. Furthermore, we have shown in a different set of feces impact tests that traces of feces were left on a SLIPS-treated surface (with underlying surface roughness ~1 μm). See FIG. 9. Therefore, our tests further demonstrate that our LESS coating outperforms various state-of-the-art surfaces on repelling viscoelastic human feces.

One important reason that urinals or toilets need to be flushed and cleaned regularly is to prevent the growth of bacteria, generation of unpleasant odor, and spread of infectious diseases. In certain regions (e.g., Brazil), rainwater is used as the source for toilet flushing. However, rainwater can contain bacteria that may contaminate the sanitation facilities. Owing to the presence of the mobile lubricant interface of LESS, we hypothesize that LESS may have comparable anti-biofouling performance as state-of-the-art materials. To verify this, we performed biofouling analyses on LESS-coated substrate and other control surfaces using natural rainwater.

Specifically, we collected rainwater from a house roof in State College, Pa., USA, and measured its bacteria content and concentration. The rainwater was collected and then stored in a refrigerator at 4° C. We tested the concentration of bacteria in rainwater by diluting the rainwater by 10× with sterilized DI water, and spread 10 μL of the rainwater and the diluted solution on a solid agar. After culturing these samples in 37° C. incubator for 36 hours, we counted the number of bacterial colonies on the agar surface to determine the concentrations. We identified the bacteria in the rainwater using a MALDI Biotyper system; and these bacteria were identified as *Staphylococcus aureus, Enterobacter cloacae, Escherichia vulneris, Escherichia hermannii, Acinetobacter calcoaceticus, Enterococcus mundtii* (Table 4), which are commonly found in rainwater.

TABLE 4

Bacteria identification from mass spectrometry.

| Organism (best match) | Score Value |
| --- | --- |
| *Staphylococcus aureus* | 2.358 |
| *Enterobacter cloacae* | 2.281 |
| *Escherichia vulneris* | 2.256 |
| *Escherichia hermannii* | 2.212 |
| *Enterococcus mundtii* | 2.219 |
| *Acinetobacter calcoaceticus* | 2.077 |

Note: Any score value >2 indicates secure genus identification.

The detailed process of the bacteria identification is as follow. 50 μL of rainwater was spread uniformly onto four different agar mediums: Thermo Scientific™ Blood Agar (TSA with Sheep Blood) Medium, Thermo Scientific™ MacConkey Agar Medium, BD BBL CHROMagar Orientation, and BD BBL MHB agar. Then the bacteria were incubated for 24 hours. Isolates were prepared for analysis using a direct transfer method following a standard Bruker protocol. Individual colonies from 24-hour cultures were transferred onto a MALDI target plate using a sterile pipette tip and allowed to dry. The cells were lysed by applying 1 μL of 80% formic acid solution in water, samples were allowed to dry and 1 μL of 10 mg/mL HCCA matrix solution in 50% aqueous acetonitrile containing 2.5% trifluoroacetic acid was applied to each sample and allowed to dry. A bacterial test standard (BTS; Bruker Daltonics) was used for instrument calibration and as a positive control. Matrix blank spots were included in each analysis to ensure that the target plate was thoroughly cleaned and there is no carryover signal. MALDI mass spectra were acquired on a Bruker Ultraflextreme MALDI TOF/TOF mass spectrometer in the linear, positive-ion mode. Spectra were processed using a factory default processing method for the Biotyper application and searched against a Bruker library containing entries of 6903 cellular organisms using MALDI Biotyper Version 3.1 software (Bruker).

Figure 10:
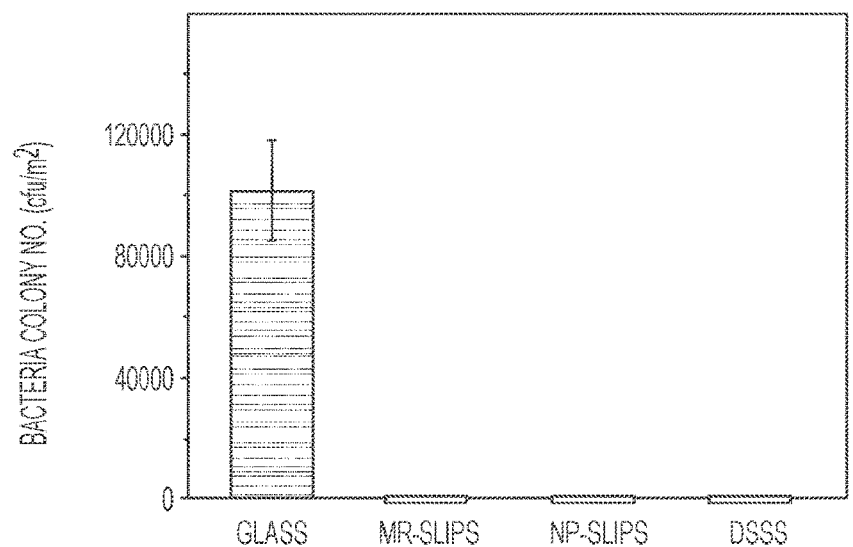
FIG. 10 is a plot comparing anti-bacterial performance of various coatings. The test included bacteria adhesion test with two types of bacteria found in rainwater on glass, SLIPS with micro-roughened glass substrate (MR-SLIPS), SLIPS with nano-roughened glass substrate (NR-SLIPS), and a LESS-coated glass. For MR-SLIPS, NP-SLIPS, and LESS there were no bacteria colony detected on these surfaces.

We rinsed the LESS-coated substrate, two SLIPS samples (one with underlying microscale roughness and the other with nanoscale roughness), and uncoated bare glass with the collected rainwater for 1 min, and then immediately incubated the substrates by attaching solid agar onto the surfaces in an incubator. After 36 hours of incubation, we counted the bacterial colonies on these surfaces. Specifically, no observable bacteria colonies were found on all SLIPS-coated and LESS-coated substrates; whereas the untreated glass surfaces were contaminated with the bacteria in the rainwater. Our results showed that the anti-biofouling performance of the LESS-coated substrate is comparable to existing state-of-the-art anti-biofouling materials (FIG. 10).

Figure 11:
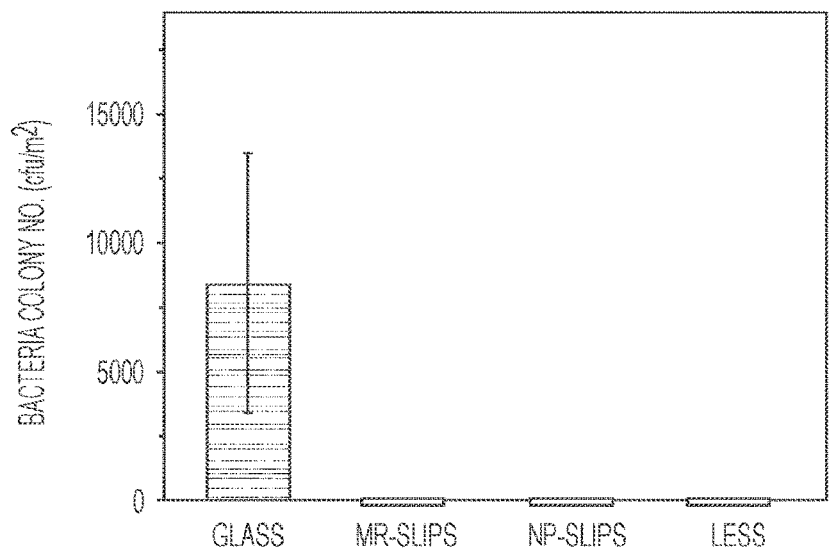
FIG. 11 is a plot comparing anti-bacterial performance comparison. The test included bacteria adhesion test with *Escherichia coli* contaminated synthetic urine on glass, SLIPS with micro-roughened glass substrate (MR-SLIPS), SLIPS with nano-roughened glass substrate (NR-SLIPS), and LESS-coated glass. For MR-SLIPS, NP-SLIPS, and LESS there were no bacteria colony detected on these surfaces.

In addition to the rainwater tests, we further characterized these surfaces with a mixture of *E. coli* and synthetic urine. 10 mL of this contaminated urine was sprayed onto the test surfaces to simulate the urination process, followed by the aforementioned procedures for the biofouling characterizations. Our test results are similar to those found in the rainwater tests, where all of the SLIPS and LESS-coated samples showed no observable bacteria colonies while the glass substrate showed significant contamination with bacteria (FIG. 11). We have further shown that SLIPS and LESS-coated substrates can repel all bacteria-contaminated synthetic urine with a sliding angle of a droplet (10 μL) less than 5°. Furthermore, LESS exhibited strong repellency towards both aqueous liquids (contact angle=105.5°±0.3° and contact angle hysteresis=0.8°±0.2°).

Figure 12A:
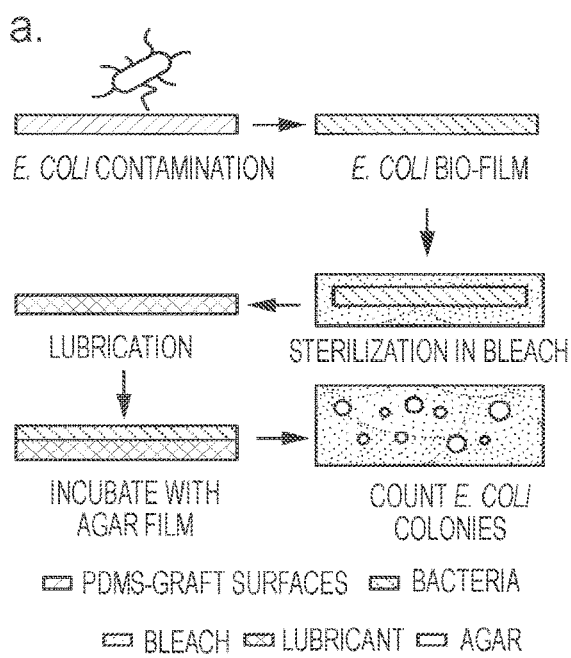
FIGS. 12a and 12b illustrate a sterilization test on PDMS-grafted surfaces with different surface roughness.
Figure 12B:
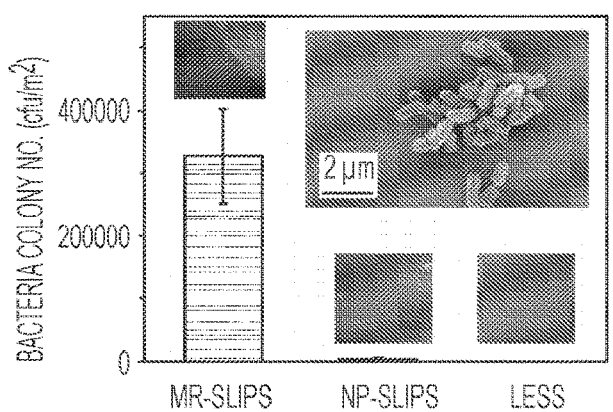
Figure 13:
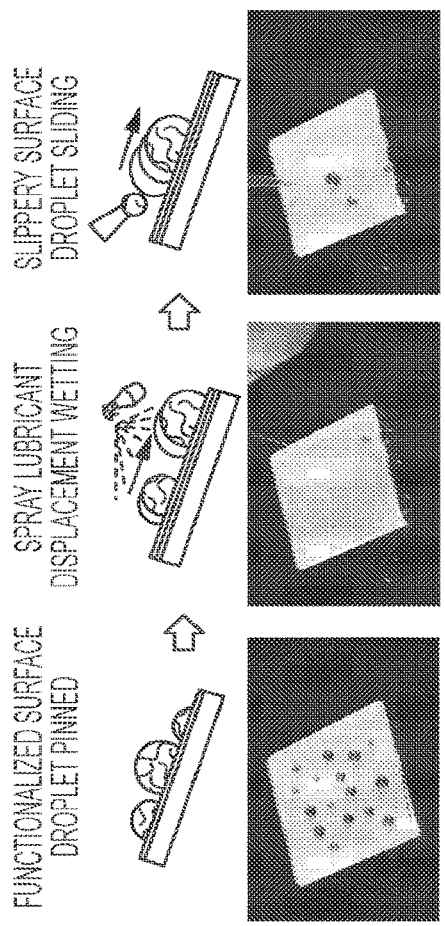
FIG. 13 shows the lubricant replenishment of LESS-coated surfaces. The schematic shows the displacement wetting phenomenon on PDMS-grafted glass. The optical images show a facile lubricant replenishment process.

It is interesting to note that in the case where the lubricant is fully depleted in SLIPS, bacteria biofilm can attach onto rougher substrates persistently. Even after sterilization with bleach and 70% of alcohol, there are still bacteria attached on the rough surfaces. In comparison, the biofilms that are initially attached onto the lubricant-depleted LESS-coated surface can be completely removed after the bleach sterilization. (FIG. 12). All of these results demonstrate that LESS has excellent anti-biofouling performance and, therefore, could minimize the use of disinfectants or other aggressive chemicals currently used for cleaning and sterilization Since LESS requires the use of lubricant for its function against liquids and viscoelastic materials, it is desirable to reapply lubricant to renew the surface in case the coating is depleted over time such as repeated toilet flushing. Since the PDMS-grafted substrate of LESS is designed to adhere the silicone oil as opposed to aqueous liquids, it is possible to replenish the lubricant layer by incorporating small amounts of silicone oil in the flushing water so that the silicone oil can preferentially wet the surface through displacement wetting (FIG. 13). Our experimental measurements have shown that Eq. (4) is satisfied (i.e., $\Delta E_2$=91.3 mN/m>0) for the displacement wetting of the lubricant. Experimentally, we have further shown that silicone oil wets the PDMS-grafted ceramic surface even when the surface has been pre-wetted by water, and subsequently forms a functional layer to repel the water (FIG. 13).

We have investigated the durability of the LESS coating against realistic water flow (i.e., 1 gallon/min to 2.8 gallon/min) and impact of synthetic feces.

For the water flow test, we put LESS-coated glass slides into the flow system at a flow rate of 1 gallon/min and 2.8 gallon/min. Our setup is capable of generating a flow rate from 1 gallon per minute (i.e., 3.8 L/min with Reynolds number, Re~4570, calculated based on the hydraulic diameter) up to 2.8 gallon per minute (i.e., ~10.6 L/min with Re~13100). The estimated wall shear stresses generated by these flows range from 0.093 Pa (at 1 gallon per min) up to 0.78 Pa (at 2.8 gallon per min), which are similar to those of typical toilets. We measured the weight of the glass slides and the glass slides with one slide lubrication. Before and after every 5 min of flushing, we measured the weight of LESS-coated glass slides. With coated area (A) of 1875 mm² and lubricant density (ρ) of 0.95 g/mL, we can calculate the lubricant height (h) with weight difference ($W_{before}-W_{after}$) by h=($W_{before}-W_{after}$)/ρ/A.

For the impact of synthetic feces test, we dropped ~5 grams of synthetic human feces from 400 mm height onto the surface at a tilting angle of 45°. Then the LESS-coated surface was put into the flow system for cleaning at a flow rate of 1 gallon/min. We verified the complete removal of the feces residues using fluorescent trace dye, which was mixed with the synthetic feces during our tests. Before and after the impact-and-flushing cycle, we measured the sliding angle of the surface using a 10 μL water drop. The LESS-coated surface was considered to be fully degraded if the sliding angle was >65°.

Figure 15:
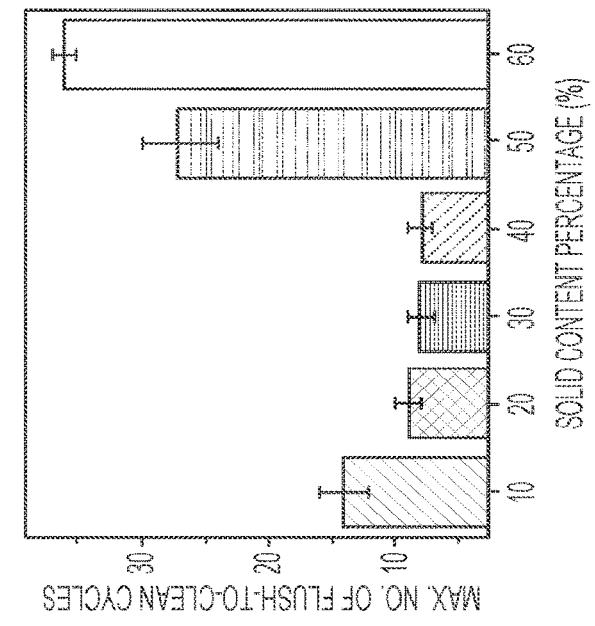
FIG. 15 is another plot which shows the durability of the LESS coating under continuous feces impact-and-flushing cycles. Error bars represent standard deviations of three independent measurements.
Figure 14:
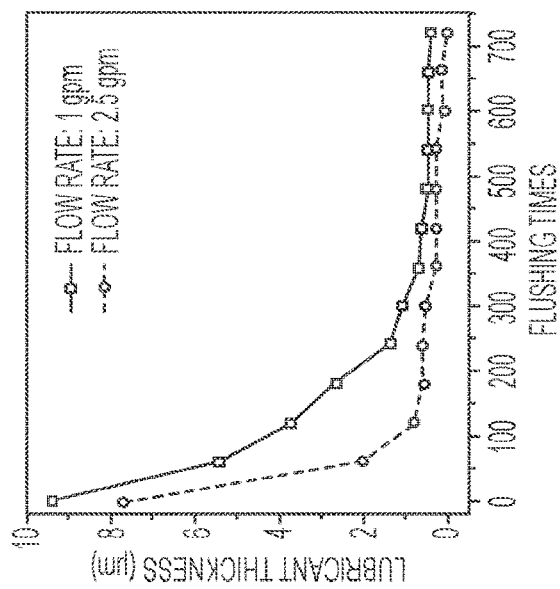
FIG. 14 is a plot which shows the durability of the lubricant layer (silicone oil with a viscosity of 20 cSt) under different flow conditions. Weight difference between LESS-coated and non-lubricated surface was measured and used to estimate the lubricant thickness.

Our results show that the LESS coating can remain functional even after >100 continuous flushes of water at a flow rate of 2.8 gallon/min (FIG. 14), as well as ~8 to 36 impact-and-flush cycles of synthetic feces of various solid contents before further replenishment is required (FIG. 15). Compared to uncoated glass surfaces, LESS-coated surfaces reduce water consumption by up to 90% for various synthetic feces at different solid contents. We have also conducted similar characterizations on SLIPS samples, and found that the water consumption increases with increasing underlying substrate roughness—a trend that is consistent with the observations in the adhesion tests.

Our measurements also indicated that SLIPS with underlying surface structures and untreated glass could consume more flushing water than liquid-entrenched smooth surfaces (LESS) to remove the feces residues.

Water flushing in real toilets can be simplistic modelled as an open channel flow.

To simulate the condition of flashing a toilet, we designed an open channel flow system, in which flow rate can be controlled. After measuring the flow height where the sample (i.e., artificial feces) is located, we can calculate the hydraulic diameter $$\left(D_h = 4R_h = \frac{4A}{P}\right),$$

and then Reynolds number $$\left(Re_D = \frac{\rho v D_h}{\mu}\right).$$

| Flow Rate (gpm) | 1.0 | 1.5 | 2.0 | 2.5 | 2.8 |
|---|---|---|---|---|---|
| Height (mm) | 4.75 | 3.62 | 5.11 | 4.27 | 4.15 |
| Re | 4578 | 7136 | 9049 | 11632 | 13081 |

As in all flow rates, the Reynolds number is larger than 4000, the flow is in turbulence. And the wall shear is calculated as follow:

| Flow Rate (gpm) | 1.0 | 1.5 | 2.0 | 2.5 | 2.8 |
|---|---|---|---|---|---|
| Wall Shear (Pa) | 0.093 | 0.33 | 0.28 | 0.60 | 0.78 |

The wall shear in our open channel flushing system is in the same order of magnitude with the shear in real toilet. Therefore, the open channel flushing system can realistically simulate the real toilet flushing condition.

With this flushing system, four flow rates were chosen in the tests, including 1.0 gpm, 1.5 gpm, 2.0 gpm, and 2.5 gpm. Four different surfaces were tested (glass, micro-roughened slippery liquid-infused porous surfaces (MR-SLIPS), nano-porous slippery liquid-infused porous surfaces (NP-SLIPS), LESS). Each surface was positioned with 45° tilting, and impacted by feces with different solid content (10% to 60%) at a height of 400 mm. The synthetic feces were mixed with UV powders (0.1 wt % in solid content) to enhance the visibility of feces residues on surfaces. Under different flow rates, we counted the time required for the surfaces to be completely free of any residues, and then calculated the corresponding amount of water required.

FIGS. 16a and 16b show the water consumption required to remove feces with 10% and 20% solid content from the surfaces. liquid-entrenched smooth surfaces (LESS) require the least amount of water, while untreated glass takes the largest amount of water. MR-SLIPS require similar amount of water to glass for two reasons. First, the feces with 10% and 20% solid content show more viscous property, which means they behave like viscous fluid. This viscous fluid took away large amount of lubricant on MR-SLIPS, and therefore more feces residues can adhere onto the surface. Second, the viscous feces removed large amount of lubricant and exposed the underlying surface structure. Once the feces residues attached on the surface structure, they are much harder to be removed.

It is noticeable that water consumption is ~10 times less in 10% solid content than 20% solid content. The feces with 20% solid content are much more elastic than 10% ones, while still behave like viscous flow. This property will cause stronger adhesion of feces residues onto the surfaces, which leads to more water consumption to remove the residues. With the increase in elasticity of the feces to 40% solid content, the water consumption increases.

The synthetic feces were repelled from the slippery surfaces (MR-SLIPS, NP-SLIPS, and LESS), while sticking to glass surfaces when the solid content of the synthetic feces increased to 30% and 40%. Different amount of residues were left on slippery surfaces due to different surface roughness of underlying substrates. Compared to all of these surfaces, glass surface required the largest amount of water to remove the residue. Water consumption increased with underlying surface roughness in liquid-infused slippery surfaces. In general, the water consumption required to clean the synthetic feces (30%-40% solid content) on the LESS is only ~10% to that of the glass (FIG. 16c and FIG. 16d).

Synthetic feces with 50% and 60% solid content requires ~½ to ~⅓ of water consumption required to remove synthetic feces with 40% solid content. Synthetic feces with higher solid content are less adhesive than those with 30% and 40% solid content.

Similar to the situation with the artificial feces with 40% solid content, the feces bounced off the slippery surfaces (MR-SLIPS, NP-SLIPS, and LESS), while was partially sticking to glass surfaces when the solid content increased to 50% and 60%. In general, the water consumption required to clean the artificial feces (50%-60% solid content) on the LESS is only ~5% to that of the glass (FIG. 16e and FIG. 16f).

There are seven types of stool or feces defined by Bristol stool scale (1. separate hard lumps, like nuts (hard to pass); 2. sausage-shaped but lumpy; 3. like a sausage but with cracks on the surface; 4. like a sausage or snake, smooth and soft; 5. soft blobs with clear-cut edges; 6. fluffy pieces with ragged edges, a mushy stool; 7. watery, no solid pieces). The synthetic feces with 10% to 60% solid content almost cover all seven types of stool. Among seven types of stool or feces, type 4 and 5 would be most healthy and common stool; while type 6 and 7 probably are diarrhea. Meanwhile, type 4 and 5 would require higher water consumption to clean toilets. We estimate that LESS only need <20% of water consumption of traditional toilet surfaces to maintain a clean surface.

Toilets/Urinals

One example to apply LESS coating on a toilet bowl/urinal involves surface cleaning, surface functionalization and lubricant coating. Surface cleaning involves the use of ethanol wipe to clean the toilet bowel/urinal. If the toilet bowel/urinal has been used and staining is observed, it is recommended to use commercially available acid cleaner to remove the stain before the surface functionalization step. Once the surface is cleaned and left dried, then surface functionalization can be proceeded which involves spraying or wiping of a silane solution (e.g., composed of isopropanol alcohol, dimethyldimethoxysilane, and an acid catalyst such as sulfuric acid) onto the toilet/urinal surface to form a permanent functional layer. Once dried, the surface can be sprayed or wiped with a matching lubricant, such as silicone oil (a viscosity of 20 cSt, Sigma Aldrich, CAS No. 63148-62-9), to complete the LESS coating process. The lubricant can be reapplied or replenished from an external source (e.g., a lubricant reservoir) as needed. A LESS-coated toilet thus prepared repels human urine and greatly reduces stickiness of human feces.

Windows

In addition to repel human waste, LESS can also be applied onto a window or camera lens to repel liquids (e.g., rain), ice, frost, insect residues, and birds' feces. As an application example, we have applied LESS coating on a car windshield (Model: Mazda CX-5, 2013). To begin with, the windshield was first cleaned with an ethanol clean wipe to remove residues on the surface. Then, a previously described silane solution (composed of isopropanol alcohol, dimethyldimethoxysilane, and an acid catalyst such as sulfuric acid) was either sprayed or wiped onto the windshield and left for complete drying for ~20 minutes. Once dried, this solution will form a permanent hydrophobic coating onto the windshield. Then silicone oil was sprayed or wiped onto the windshield to complete the coating process. This lubricant layer can be reapplied or replenished from an external source (e.g., a windshield wiper fluid reservoir) as necessary. In this specific example, the coating was applied under environment conditions at 4° C. and a relative humidity of ~60%.

To maintain the optical clarity of the window or lens, the lubricant used for the LESS coating will need to have a similar refractive index as the base glass substrate. For example, typical glass has a refractive index, n~1.4-1.5 and a typical matching lubricant would have a refractive index that is within the difference of +/−0.1. Examples of the lubricants include silicone oil (n~1.4) and plant oils (n~1.46-1.47).

The LESS-coated windshield has superior performance in repelling rain droplets as compared to an uncoated windshield glass and a windshield glass treated with commercial available coatings (e.g., Rain-X). Specifically, when the windshield is in static position, water droplets of ~1-3 mm will begin to slide off from the windshield. When the car is travelling at a speed of ~20-25 mph, water droplets of ~1-2 mm begin to shed off from the windshield. At a speed of ~30-35 mph, most of the water droplets (with size <~1 mm) will shed off from the windshield. At a speed over ~45 mph, all of the water droplets (with size <~1 mm) will be shed off immediately when they impact the glass. In comparison, rain drops (with size >~1 cm) remain stuck to the uncoated windshield even when the speed reaches ~40 mph, and water droplets of >~5 mm begin to shed off at >~30 mph on Rain-X-coated windshield according to the published demonstration.

Anti-Frosting/Icing

Furthermore, LESS-treated surface can delay frost/ice formation and can significantly reduce the de-icing time. As an example, LESS-coated silicon can delay the ice formation as compared to uncoated smooth silicon. Specifically, ice covers a 25 mm-by-25 mm area by ~9.7±0.4 min on untreated silicon wafer, and by 13.7±1.1 min on LESS-coated silicon. Meanwhile, the de-icing time of LESS-coated silicon is 1.3±0.1 min comparing to 1.5±0.1 min for untreated silicon.

The LESS-coated silicon was made through the two-step spray coating process in room condition (23° C. and 50% relative humidity). Specifically, a smooth silicon wafer was cleaned with ethanol and deionized water. A silane solution was then applied by spraying the solution onto the cleaned, smooth silicon wafer. After the surface was dried, lubricant (e.g. silicone oil) was sprayed on the surface to complete the LESS coating.

The anti-icing test was performed on a Peltier plate with a 90° tilting angle. The surfaces were cooled down to ~−5° C. at room environment (23° C. and 30% relative humidity). The icing and de-icing was recorded by a camera for measuring the time.

We conducted a field test to demonstrate the anti-frost performance of LESS-coated windshield. The test was conducted in an early morning during the winter time at State College, Pa. Specifically, the windshield was covered with frost at −2° C. at 100% relative humidity on both treated and untreated windshield. After wiping with the windshield wiper twice, the LESS-coated surface was defrosted immediately and became visually clear, while the untreated area was still heavily covered with frost with very low visibility. This indicates that frost has a very low adhesion on the LESS-treated windshield as compared to the untreated surface.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Fabrication Process of MR-SLIPS

Slippery liquid-infused porous surfaces with microroughened surface structure (MR-SLIPS) were fabricated by the following steps. First, laser roughening was applied on glass slides with 35% of maximum power (25 W) and 90% of maximum scanning speed by a laser cut machine (Universal Laser vls2.0). Second, the glass slides were further roughened by buffered oxide etch of HF (6:1) for 20 min. Third, the surfaces were hydroxidized by oxygen plasma for 10 min, and then dipped into the coating solution. After drying, silicone oil as lubricant was sprayed onto the surfaces.

Fabrication Process of NP-SLIPS

Slippery liquid-infused porous surfaces with nano-porous surface structure (NP-SLIPS) were fabricated by following steps. First, the glass slides were submerged into 1M of sodium bicarbonate aqueous solution at 100° C. for 24 hours. Second, the surfaces were hydroxidized by oxygen plasma for 10 min, and then dipped into the coating solution. After drying, silicone oil as lubricant was sprayed onto the surfaces.

Surface Roughness Measurement

Surface roughness of grafted-PDMS glass slide and nano-porous glass slide was measured by atomic force microscope (AFM) using tapping mode. The scanning area was $2\times2$ $\mu m^2$. Surface roughness of nano-porous glass slide and micro-roughened glass slide was measured by Zygo optical profilometer. The measured area was $475\times475$ $\mu m^2$. Measurement by AFM provides roughness in 0.1-nanometer scale whereas optical profilometer (Zygo) provides roughness in 1-nanometer scale.

X-Ray Photoelectron Spectroscopy (XPS) Measurement

Untreated quartz glass slide and grafted-PDMS coated quartz glass slide were characterized under XPS with area of 1 mm in diameter circle and depth of 10 nm for 3 different spots.

Visco-Elasticity Measurement

Oscillatory rheology testing was conducted using a TA Instruments DHR-2 rheometer. Samples were maintained at 23° C. on a Peltier plate. Oscillatory frequency sweeps were performed to probe the materials. The angular frequency range was 0.1 to 100 rad/s. Oscillatory strain was set at 0.5% to ensure all tests were within the linear range.

The results show that with increasing solid concentration, synthetic feces possesses higher elastic modulus (G') and viscous modulus (G") when the artificial feces change from soft to hard solids with phase angle decreasing.

Adhesion Measurement

A TA Instruments DHR-2 rheometer was used to measure axial adhesion force using a probe method. Artificial feces were casted into a PDMS mold (25 mm×25 mm×4 mm) to maintain volume and placed on the lower Peltier plate kept at 23° C. Sample surfaces (25 mm×25 mm) were bounded to the rheometer upper head. First, the upper head drove the surfaces downward at 500 µm/s pressing the artificial feces to 1 mm high. Maximum preloading force was measured in this stage. Secondly the synthetic feces were left to relax for 5 min. Finally, the rheometer upper head moved upward at 10 µm/s until full detachment (axial force dropped to zero). Work of debonding, i.e. work done by the upper head in the final stage, was calculated to characterize the adhesion properties.

Water Consumption Measurement

The open channel flushing system include the following components: a water tank as flow source; pipes; a pump; a valve; a square duct as the flushing open channel; sample mount printed by a 3-D printer.

Bacteria Attachment Experiment of Rainwater

Rainwater was collected from house roof at Park Crest Terrace, State College, Pa., USA. The rainwater was maintained at 4° C. before being used for experiment. The open channel system was sterilized by alcohol (70%) before the flushing experiment. Solid agar was made by mixing Mueller Hinton broth powder (21 g/L) and agar powder (1.5 wt %) into DI water, and sterilizing for 2 hours. Before the agar solidify, we poured it onto glass slides ($50\times75$ mm$^2$), and let the agar solidify. Then a thick film of solid agar was made. We adhered the agar films onto surfaces (glass, MR-SLIPS, NP-SLIPS, LESS) flushed by rainwater (1 gpm, 10 s), and culture them at 37° C. for 48 hours. As we used glass slides ($25\times75$ mm$^2$) as base substrates, we counted bacteria colony within the area of $25\times25$ mm$^2$. In each surface, we used at least two different samples for the experiments. The error bars are the standard derivations resulting from counting the bacterial colonies in at least 6 different areas.

Bacteria Attachment Experiment of E. coli Contaminated Urine

E. coli culture solution was mixed into synthetic urine, with a concentration of $5\times10^5$ cfu/mL. 100 mL of this E. coli contaminated urine was poured onto the test surfaces. Solid agar was made by mixing Mueller Hinton broth powder (21 g/L) and agar powder (1.5 wt %) into DI water, and sterilizing for 2 hours. The agar was poured onto glass slides ($50\times75$ mm$^2$) to solidify. Then a thick film of solid agar was formed. We adhered the agar films onto surfaces (glass, MR-SLIPS, NP-SLIPS, LESS) flushed by rainwater (1 gpm, 10 s), and culture the samples at 37° C. for 24 hours. As we used glass slides ($25\times75$ mm$^2$) as base substrates, we counted bacteria colony in area of $25\times25$ mm$^2$. In each surfaces, we used at least two different samples for the experiments. The error bars are the standard derivations resulting from counting the bacterial colonies in at least 6 different areas.

Sliding Angle Measurement

10 µL of bacteria contaminated urine was put onto the test surfaces (glass, MR-SLIPS, NP-SLIPS, LESS). A goniometer was used to measure the sliding angle. We gradually tilted the stage at a speed of 0.03°/s, and took an image at every second. Then we reviewed the images, and determined the tilting angle at which the droplet began to move. This tilting angle is defined as the sliding angle.

Bacterial Contamination on Different Slippery Surfaces

A series of experiments were conducted to explore bacterial contamination on different slippery surfaces. First, we sterilized MR-SLIPS, NP-SLIPS, and LESS before lubrication by wiping them with alcohol (70%) wipes, and then lubricated them with sterilized silicone oil. Solid agar film was adhered onto these surfaces afterwards for bacterial culture. MR-SLIPS and NP-SLIPS both showed bacterial contamination; while LESS was free of observable bacterial contamination. Second, we sterilized MR-SLIPS, NP-SLIPS, and LESS before lubrication by immersing them into alcohol (70%) for 1 hour. Then solid agar film was adhered onto these surfaces afterwards for bacterial culture. MR-SLIPS had serious bacterial contamination. NP-SLIPS had noticeable bacterial contamination. Only LESS was free of bacterial contamination. The result was shown in FIG. 12. Third, we focused on sterilizing MR-SLIPS. MR-SLIPS before lubrication were sterilized separately by immersing into alcohol (70%) and bleach each for 1 hour respectively, and then proceed to baking at 150° C. for 10 min. We noticed that it was very hard to sterilize the slippery surfaces with roughness. Only bleach would remove the bacterial contamination completely.

Scanning Electron Microscope (SEM)

The SEM images for roughened glass with a conductive 30 nm platinum film was taken by Zeiss scanning electron microscope.

The SEM images of bacteria on glass with a conductive 30 nm platinum film was taken by Zeiss scanning electron microscope.

Component of Synthetic Feces

The component of synthetic feces used in all experiments is list in the following table. The nutrition percentage is similar to human feces. See, e.g., Rose et al., The Characterization of Feces and Urine: A Review of the Literature to Inform Advanced Treatment Technology. *Critical Reviews in Environmental Science and Technology* 45, 1827-1879, (2015).

| Ingredients | % dry mass | Nutrition |
| --- | --- | --- |
| Yeast | 32.49 | Biomass |
| Psyllium | 10.84 | Fibre |
| Peanut oil | 17.31 | Fat |
| Miso | 10.84 | Fibre/Protein/Fat |
| Polyethylene glycol | 12.14 | Carbohydrate |
| Inorganic calcium phosphate | 10.84 | Biomass |
| Cellulose | 5.53 | Carbohydrate |

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A coating on a smooth surface of a substrate, the coating comprising a chemical layer on the smooth surface and a lubricant layer adhered to the chemical layer;
    wherein the coating repels a foreign liquid;
    wherein the smooth surface has an average roughness (Ra) of less than 4 μm;
    wherein the chemical layer is formed by polymerizing a coating composition with hydroxyl functional groups on the smooth surface of the substrate to form a chemical layer of graft polymers having ends anchored to the smooth surface;
    wherein the coating composition includes: (i) a polymerizable silane selected from the group consisting of dimethyldimethoxysilane, dimethoxy-methyl(3,3,3-trifluoropropyl)silane, dimethoxy(methyl)octylsilane, diethoxydimethylsilane, (ii) a solvent and (iii) an acid catalyst; and
    wherein the lubricant satisfies a thermodynamic condition of:

$$\Delta E_1 = \gamma_B \cos \theta_B - \gamma_A \cos \theta_A - \gamma_{AB} > 0$$

wherein $\gamma_A$ and $\gamma_B$ are, respectively, surface tensions of the foreign liquid and the lubricant on the smooth surface of the substrate, $\gamma_{AB}$ is an interfacial tension at an interface between the foreign liquid and the lubricant, and $\theta_A$ and $\theta_B$ are, respectively, equilibrium contact angles of the foreign liquid and the lubricant on the smooth surface of the substrate.

2. The coating of claim 1, wherein the smooth surface is not roughened prior to polymerizing the coating composition to form the chemical layer.

3. The coating of claim 1, wherein the lubricant forming the lubricant layer has a viscosity of from about 18 cSt to about 1,000 cSt at 25° C.

4. The coating of claim 1, wherein the smooth surface of the substrate comprises glass, porcelain, and/or metal.

5. The coating of claim 1, wherein the polymerizable silane is dimethyldimethoxysilane and the dimethyldimethoxysilane is polymerized into polydimethylsiloxane.

6. The coating of claim 1, wherein the smooth surface comprises the substrate of a medical device.

7. The coating of claim 1, wherein the smooth surface is a smooth surface of a toilet, urinal or sink.

8. The coating of claim 1, wherein the chemical layer has a thickness from 1 nm to 10 μm and the lubricant coating has a thickness of from 1 nm to 1 mm.

9. The coating of claim 1, wherein the lubricant comprises a plant oil.

10. The coating of claim 1, wherein the lubricant comprises a silicone oil.

* * * * *